United States Patent
Sekizawa et al.

(10) Patent No.: US 6,821,033 B2
(45) Date of Patent: Nov. 23, 2004

(54) ELECTROMAGNETIC ACTUATOR AND SHUTTER DEVICE FOR CAMERA

(75) Inventors: Koji Sekizawa, Tokyo (JP); Nobuyoshi Inoue, Tokyo (JP); Kiyosi Toma, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/181,753

(22) PCT Filed: Nov. 19, 2001

(86) PCT No.: PCT/JP01/10080

§ 371 (c)(1),
(2), (4) Date: Jul. 19, 2002

(87) PCT Pub. No.: WO02/43227

PCT Pub. Date: May 30, 2002

(65) Prior Publication Data

US 2003/0012573 A1 Jan. 16, 2003

(30) Foreign Application Priority Data

Nov. 21, 2000 (JP) .......................... 2000-353832
Jan. 23, 2001 (JP) .......................... 2001-014360

(51) Int. Cl.[7] .............................. G03B 9/08; H02K 1/12
(52) U.S. Cl. ........................................ 396/463; 310/258
(58) Field of Search ................................ 396/463, 464, 396/469, 480, 484; 310/49 R, 216, 217, 91, 250, 258, 259, 179, 180, 184, 185, 187, 193

(56) References Cited

U.S. PATENT DOCUMENTS

| | | | | |
|---|---|---|---|---|
| 3,672,282 A | * | 6/1972 | Yamada ...................... 396/456 |
| 4,554,471 A | * | 11/1985 | Bertram et al. ........... 310/49 R |
| 4,675,566 A | * | 6/1987 | Nystuen et al. ............. 310/254 |
| 4,799,074 A | * | 1/1989 | Kawamura et al. ......... 396/410 |
| 5,264,896 A | | 11/1993 | Lee |
| 5,384,506 A | * | 1/1995 | Aoshima ................... 310/49 R |
| 5,418,588 A | * | 5/1995 | Chigira ....................... 396/463 |
| 5,729,071 A | * | 3/1998 | Steiner ....................... 310/254 |
| 5,749,014 A | | 5/1998 | Shimada |
| 5,757,108 A | * | 5/1998 | Suzuki ..................... 310/49 R |
| 5,822,629 A | | 10/1998 | O'Brien |
| 5,926,663 A | | 7/1999 | Suzuki |
| 6,000,860 A | | 12/1999 | Krueger |
| 6,071,019 A | | 6/2000 | Shimada |
| 6,331,741 B1 | * | 12/2001 | Suzuki ..................... 310/49 R |

FOREIGN PATENT DOCUMENTS

| | | |
|---|---|---|
| EP | 1061636 A1 | 12/2000 |
| JP | 01-310329 | 12/1989 |
| JP | 8-190123 | 7/1996 |
| JP | 08-254729 | 10/1996 |
| JP | 09-329827 | 12/1997 |
| JP | 10-20364 | 1/1998 |
| JP | 11-103567 | 4/1999 |
| JP | 2000-284342 | 10/2000 |

* cited by examiner

Primary Examiner—Christopher Mahoney
(74) Attorney, Agent, or Firm—Pillsbury Winthrop LLP

(57) ABSTRACT

An electromagnetic actuator applied to a camera shutter device includes a rotatable disk-shaped rotor (10) magnetized with different polarities and having an output portion (10b), a first plate-like yoke (40) with a first magnetic pole part (41) opposed to the outer peripheral surface of the rotor (10) and a second plate-like yoke (50) with a second magnetic pole part (51) opposed to the outer peripheral surface of the rotor (10), and a first coil (20) and a second coil (30) wound around the joint areas of the yokes so that the first and second coils become flat in the same direction as the first yoke (40) and the second yoke (50). By virtue of this configuration, the electromagnetic actuator can be thinned. Furthermore, the camera shutter device using this electromagnetic actuator and thus the camera can be thinned and miniaturized.

36 Claims, 28 Drawing Sheets

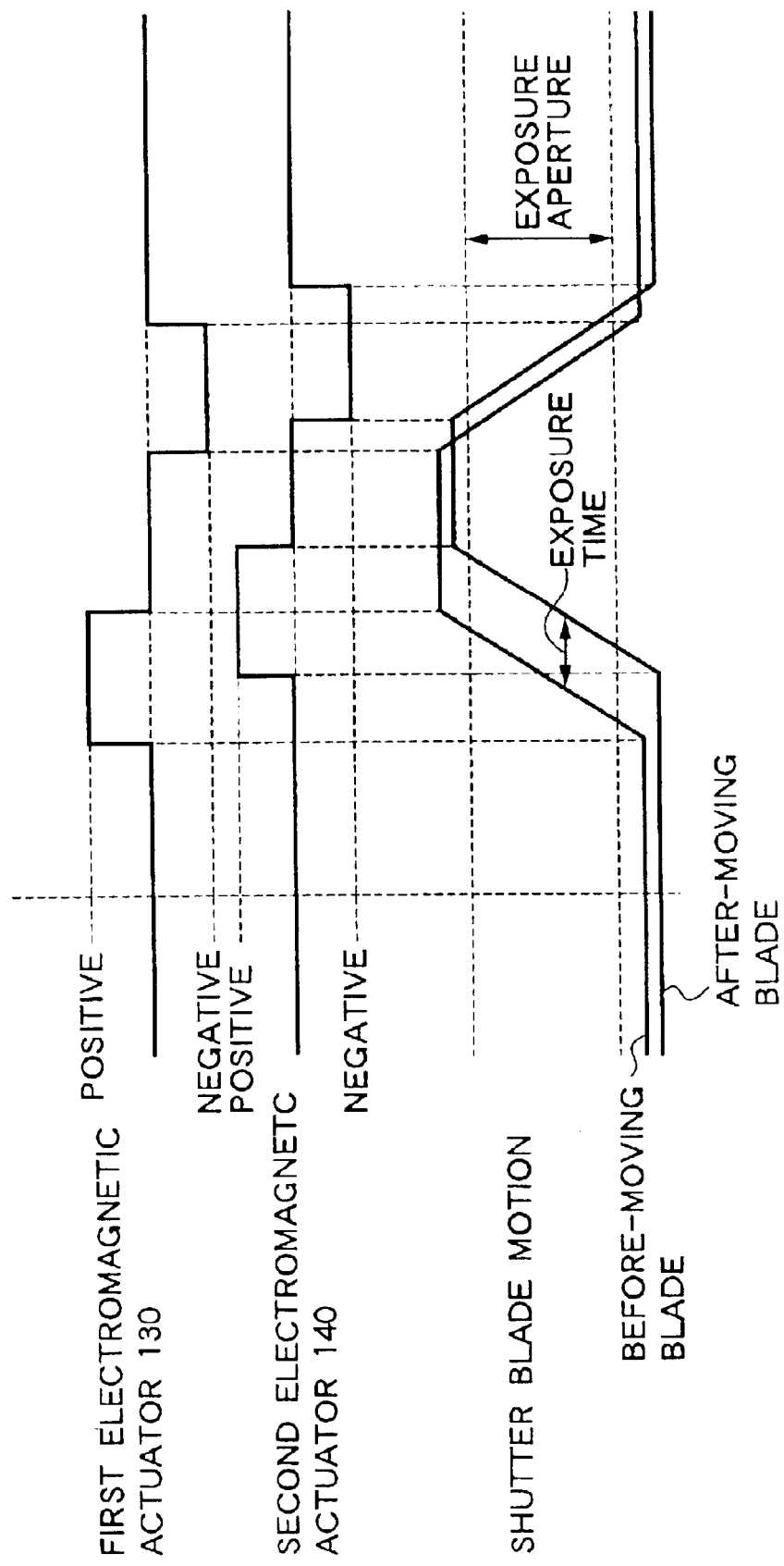

ELECTROMAGNETIC ACTUATOR AND SHUTTER DEVICE FOR CAMERA

This application is the National Phase of International Application PCT/JP01/10080 filed Nov. 19, 2001 which designated the U.S. and that International Application was not published under PCT Article 21(2) in English.

TECHNICAL FIELD

The present invention relates to an electromagnetic actuator having a rotor that rotates within a predetermined angular range and relates to a camera shutter device that uses such an electromagnetic actuator as its drive source.

BACKGROUND ART

Electromagnetic actuators used as drive sources for a camera shutter devices, particularly focal-plane type camera shutter devices are known from, for example, Unexamined Japanese Patent Gazettes No. 1-310329, No. 8-190123 (corresponding to U.S. Pat. No. 5,749,014), No. 8-254729, No. 9-329827, and No. 10-20364 (corresponding to U.S. Pat. No. 6,071,019), and U.S. Pat. Nos. 5,822,629 and 6,000,860.

The electromagnetic actuators disclosed in the gazettes or the like comprise a rotor with a cylindrical permanent magnet that outputs a rotational driving force, a frame member that rotatably supports the rotor, and a coil wound around the outside of the frame member.

These electromagnetic actuators are arranged on the base plate as drive sources for camera shutter devices so that the actuators are set correspondingly with before-moving (or first-moving) and after-moving (or second-moving) shutter blades, and open and close the aperture for exposure by driving the before-moving and after-moving shutter blades respectively through a complex interlocking mechanism including a drive lever.

The shutter devices are also provided with a stopper mechanism that positions the shutter blades at the operation start position before the shutter blades start moving for the exposure operation and a brake mechanism that prevents bounds or the like of the shutter blades at the completion of the movement.

In the conventional electromagnetic actuator, the coil is wound around the outside of the rotor in the direction of the rotation axis of the rotor so as to surround the axis, thereby increasing the height or the thickness of the electromagnetic actuator.

Therefore, if the actuator is used as a drive source for a focal-plane camera shutter device to be incorporated particularly in a camera or the like required for thinness, the freedom of its arrangement is limited due to its great height (thickness). As a result, it is difficult to produce a thin camera with the actuator.

The camera shutter devices disclosed in Unexamined Japanese Patent Gazettes No. 8-190123 (corresponding to U.S. Pat. No. 5,749,014) and No. 10-20364 (corresponding to U.S. Pat. No. 6,071,019) adopt an electromagnetic actuator composed of flat yokes, a coil wound around the yokes and a rotor placed between the yokes, and use the actuator as a trigger mechanism to release the before-moving and after-moving shutter blades engaged and stopped. The devices are designed to move the before-moving and after-moving shutter blades by releasing the spring force charged by the complex charging mechanism.

Therefore, the devices use complex mechanisms such as a charging mechanism, a trigger mechanism (engagement and stop release mechanism) or the like, thereby increasing the number of parts used and complicating their structures. As a result, the device becomes large and the cost is increased accordingly.

The present invention is made in view of the problems. The purpose of the present invention is to provide an electromagnetic actuator that enables the simplification of the structure, low power consumption and thinning of the device as well as a camera shutter device with such an actuator and even a camera shutter device that gives a desired stable exposure operation.

DISCLOSURE OF THE INVENTION

The electromagnetic actuator in the present invention comprises an exciting coil, a yoke forming a magnetic circuit and a rotatable rotor which is magnetized with different polarities, rotates within a predetermined angular range through the supply of current to the coil, and has an output portion to output the driving force externally. The yoke comprises flat plate-like yokes provided with first and second magnetic pole parts formed to be opposed to the circumference surface of the rotor. The coil comprises first and second coils wound in such a manner that different polarities are generated in the first and second magnetic pole parts and the coils become flat in the same direction as the plate-like yoke when the current is turned.

According to this configuration, when the first and second coils are supplied with electricity, generated lines of magnetic force pass through the plate-like yokes and cause the generation of different poles (north pole in one part and south pole in the other part) in the first and second magnetic pole parts, and then, by the relationship between the rotor's magnetic pole (north pole and south pole) and the generated poles, the rotor rotates within the predetermined angular range and outputs the driving force externally.

As shown above, the electromagnetic actuator is composed of a flat plate-like yoke and first and second coils wound flat, thereby increasing the driving force and at the same time, making the device thin (flat).

Herein, the plate-like yoke may be laminated with a plurality of magnetic plates in the direction of the rotation axis of the rotor.

According to this configuration, a plate-like yoke whose thickness conforms to various specifications by selecting the suitable number of magnetic plates for lamination as required can be formed.

In addition, the plate-like yoke may be divided into two parts, which are of a first yoke having a first magnetic pole part and a second yoke having a second magnetic pole part, in the direction substantially perpendicular to the rotor's rotation axis. The first and second coils may be wound around the joint areas of the first and second yokes, respectively.

According to this configuration, the assembly efficiency is improved by dividing the plate-like yoke into two parts. The bobbin, etc. that winds the coils can also serve as a member for joint by winding the first and second coils around the joint areas of the first and second yokes. Furthermore, the number of part types is decreased by making the divided first and second yokes identical in shape, whereby the management cost, etc. can be reduced.

The first and second yokes may be jointed at least on the planes overlapping in the direction of the rotor's rotation axis.

If a yoke whose thickness in the direction of the rotor's rotation axis is thin is used and the two divided yokes are jointed in the direction perpendicular to the rotor's rotation axis, enough joint area can not be obtained due to the thin plate. According to this configuration, however, the enough joint area for the two yokes can be obtained by jointing them on the planes overlapping in the direction of the rotor's rotation axis. That is to say, the magnetic efficiency on the interface of the two-divided yokes can be enhanced while the yokes can be thinned.

The first and second yokes may be jointed to get engaged with each other on the planes alternately overlapping in the direction of the rotor's rotation axis.

According to this configuration, the magnetic efficiency on the interface can be enhanced while the yokes can be thinned, as shown above. Moreover, since the first and second yokes are jointed to engage with each other by overlapping them alternately, sufficient joint strength can be obtained even though a thin plate is used as the laminated magnetic plate.

The first and second coils are arranged opposite each other with the rotor sandwiched therebetween. The first and second magnetic pole parts are arranged opposite each other in the direction substantially perpendicular to the direction that the first and second coils are arranged opposite each other, and have a constricted portion formed by narrowing down the cross section as the magnetic circuit, compared with the other portions.

According to this configuration, the lines of magnetic force generated by the first and second coils affect the first and second magnetic pole parts differently with the constricted portion as the boundary of their influence. By this effect, an efficient magnetic circuit is formed and the rotor can efficiently generate a rotary driving force.

A substantially semi-cylindrical opposite surface opposed to the rotor may be formed on the first and second magnetic pole parts, while the constricted portions may be formed on the middle portions (that is, the areas corresponding to the middle portions in the direction of the circumference of the opposite surfaces) of the first and second magnetic pole parts.

According to this configuration, the first and second magnetic pole parts supply a greater electromagnetic force to the rotor and the respective lines of magnetic force generated by the first and second coils act on the rotor symmetrically, and therefore, the rotor can generate a stable rotary driving force.

The camera shutter device in the present invention is provided with a shutter blade that opens and closes the aperture for exposure and a drive source that drives the shutter blade. This drive source is an electromagnetic actuator that includes an exciting coil, a yoke forming a magnetic circuit, and a rotatable rotor that is magnetized with different polarities, rotates within the predetermined angular range and has an output portion outputting the driving force externally when the coil is supplied with current. The yoke is composed of flat plate-like yokes that have respective first and second magnetic pole parts opposed to the peripheral surface of the rotor. The coil is composed of first and second coils wound in such a manner that different polarities are generated in the first and second magnetic pole parts and the coils become flat in the same direction as the plate-like yoke.

According to this configuration, by using a thinned (flat) electromagnetic actuator as the drive source, a camera shutter device can be thinned, and therefore, a camera that incorporates such a camera shutter device can also be thinned.

Herein, the shutter blade may be composed of a before-moving blade and an after-moving blade that open and close the aperture by substantially linear reciprocating motion, while the drive source may be composed of first and second electromagnetic actuators to drive the before-moving and after-moving blades, respectively.

According to this configuration, a focal-plane type shutter device that is equipped with the before-moving and after-moving blades as a shutter blade can be thinned.

The first and second electromagnetic actuators may be arranged on both sides sandwiching the aperture, arranged by lining on one side of the aperture, or arranged by lining parallel to each other in the longitudinal direction on one side of the aperture.

According to this configuration, if the electromagnetic actuators are arranged on both sides sandwiching the aperture, for example, a digital still camera or the like that requires no storage space for film cartridges can be further thinned by arranging one of the electromagnetic actuators in the portion corresponding to the storage space. On the other hand, if the electromagnetic actuators are arranged on one side of the aperture, parts-intensive configuration can be made and the width of a camera can be narrowed, and therefore, the camera can be miniaturized. If the electromagnetic actuators are arranged parallel to each other particularly in the longitudinal direction, the width of the camera can be reduced vertically.

Herein, the electromagnetic actuator may be an actuator urged magnetically to enable the shutter blade to keep the aperture closed in the non-energized condition, an actuator urged magnetically to enable the shutter blade to keep the aperture opened in the non-energized condition, or an actuator urged magnetically to enable the shutter blade to keep the aperture closed and keep the aperture opened in the non-energized condition.

According to these configurations, a desired shutter function can be obtained while power consumption is reduced.

The shutter blade may be composed of first and second shutter blades that open and close the aperture by reciprocating motion, while the drive source may be of a single electromagnetic actuator that drives the first and second shutter blades.

According to this configuration, by using a single thinned (flat) electromagnetic actuator as the drive source, for example, the lens shutter device, etc. disposed in the lens barrel of a camera can be thinned (made flat).

The camera shutter device in the present invention includes a shutter blade that opens and closes the aperture for exposure, such an electromagnetic actuator as above that directly drives the shutter blade as a drive source to move it for exposure operation, and a control means for controlling current supply for the drive source.

The control means may control current supply in the direction reverse to the direction of moving the shutter blade for the drive source in order to position the shutter blade immediately before the blade is moved, control current supply for the electromagnetic drive source so that electric power is lower in the area where the shutter blade is on the move after starting moving than in the area where the shutter blade starts moving, or control current supply in the direction reverse to the direction of moving the shutter blade for the drive source immediately before the shutter blade completes the movement.

According to this configuration, by controlling current supply in the reverse direction immediately before the blade moves, a reverse biasing force is generated by the electromagnetic drive source, and the shutter blade starts moving in the condition that the shutter blade is securely positioned at the operation (movement) starting position. By this effect, the exposure operation becomes stable. By controlling current supply so that electric power is low in the area where the blade is on the move, the shutter blade continues moving due to its inertia force, thereby reducing the power consumption required to drive the shutter blade. Furthermore, by controlling current supply in the reverse direction immediately before the blade completes the movement, the electromagnetic drive source generates the reverse driving force to brake the shutter blade moving due to its inertia force, thereby preventing a bound phenomenon, etc. when the blade stops after hitting the stopper or the like. As a result, the shutter blade stops promptly, and the time required for a single exposure operation is shortened and high-speed successive photography, etc. can be performed.

Herein, in order to control current supply for low electric power in the area where the blade is on the move, the means may control current supply by lowering the value of the current supplied or control current supply by pulse. According to this configuration, by a simple control method, the shutter blade can perform stable exposure operations while the power consumption is reduced.

In the device, the shutter blade may be composed of a before-moving blade and an after-moving blade that open and close the aperture by reciprocating motion, an electromagnetic actuator may be composed of a before-moving blade electromagnetic actuator to drive the before-moving blade and an after-moving blade electromagnetic actuator to drive the after-moving blade, and the means may control the current supply as above for the before-moving blade and after-moving blade electromagnetic actuators.

According to this configuration, by a series of current supply control mentioned above is made for the before-moving blade and after-moving blade electromagnetic actuators, for example, in a focal-plane type camera shutter device, power consumption is reduced, a bound phenomenon or the like is prevented and stable exposure operations can be performed by the before-moving blade and after-moving blade.

In addition, in the device, the shutter blade may be composed of first and second shutter blades that open and close the aperture by reciprocating motion, the electromagnetic actuator may be composed of a first electromagnetic actuator to drive the first shutter blade and a second electromagnetic actuator to drive the second shutter blade, and the control means may control the current supply for the first and second electromagnetic actuators in such a manner that the first shutter blade moves as a before-moving blade and the second shutter blade moves as an after-moving blade, and then, the second shutter blade moves as a before-moving blade and the first shutter blade moves as an after-moving blade.

According to this configuration, the first and second shutter blades serve alternately as a before-moving blade and an after-moving blade, whereby it is possible to make it unnecessary for the shutter blades to perform the return operation after their complete movement, simplify the control sequence and increase the frequency of successive photography if required.

BRIEF DESCRIPTION OF THE DRAWINGS

FIG. 11 is a flowchart that explains the operation of the camera shutter device.

BEST MODE FOR CARRYING OUT THE INVENTION

An embodiment of the present invention will be now described with reference to the accompanying drawings.

Figure 1:
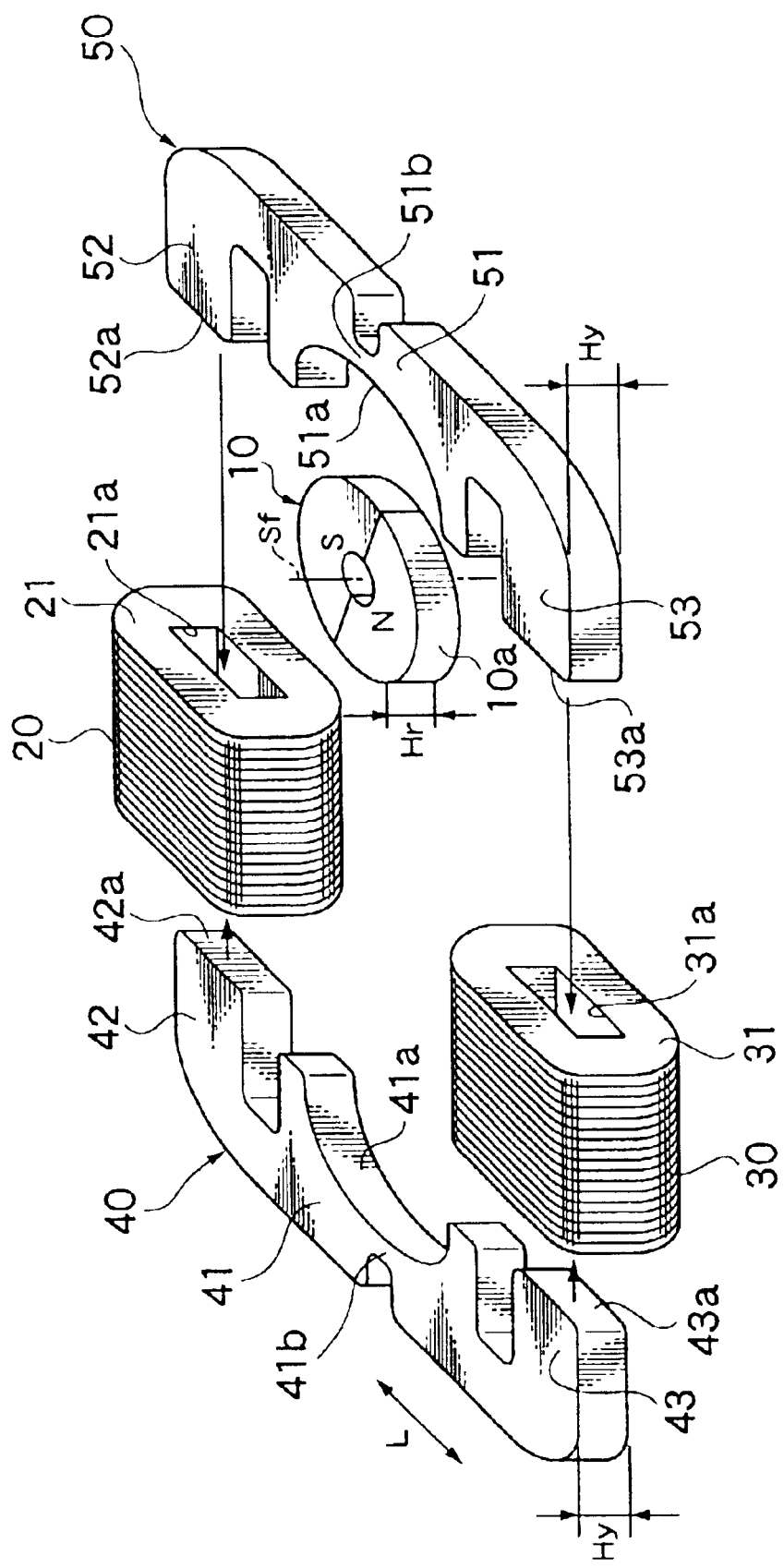
FIG. 1 is an exploded perspective view that shows an embodiment of an electromagnetic actuator in accordance with the present invention.
Figure 2A:
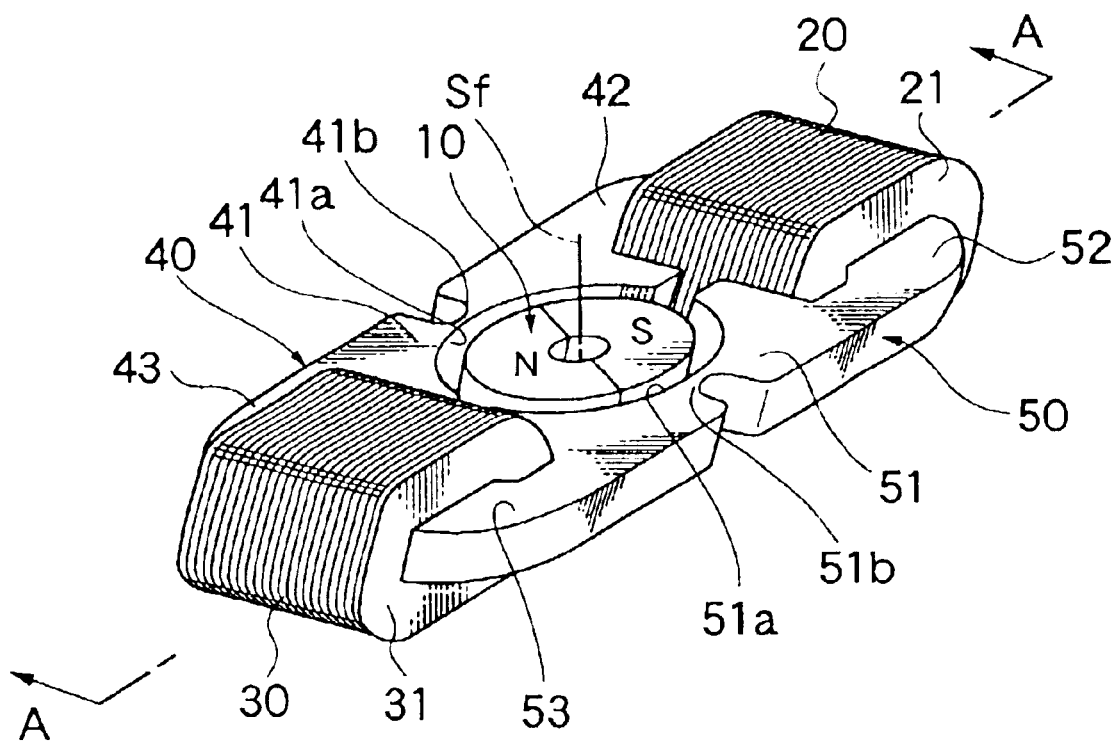
FIG. 2A is a perspective view of the assembled electromagnetic actuator.
Figure 2B:
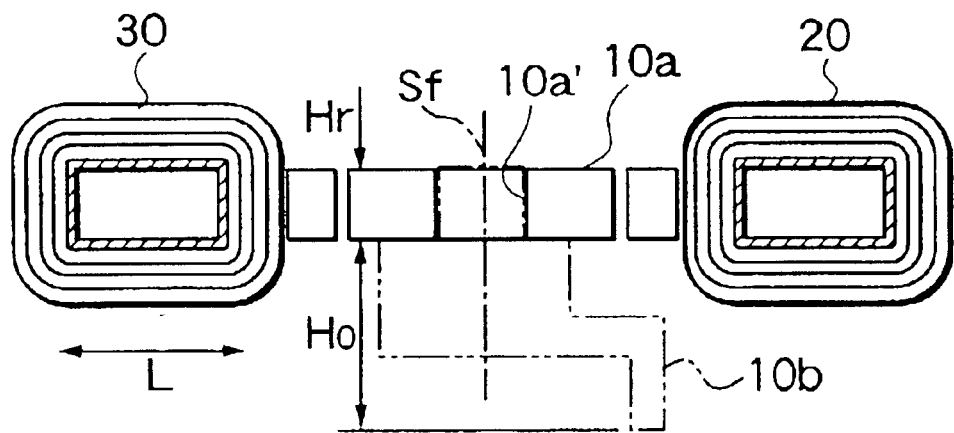
FIG. 2B is a cross-sectional view of the portion A—A shown in FIG. 2A.
Figure 3:
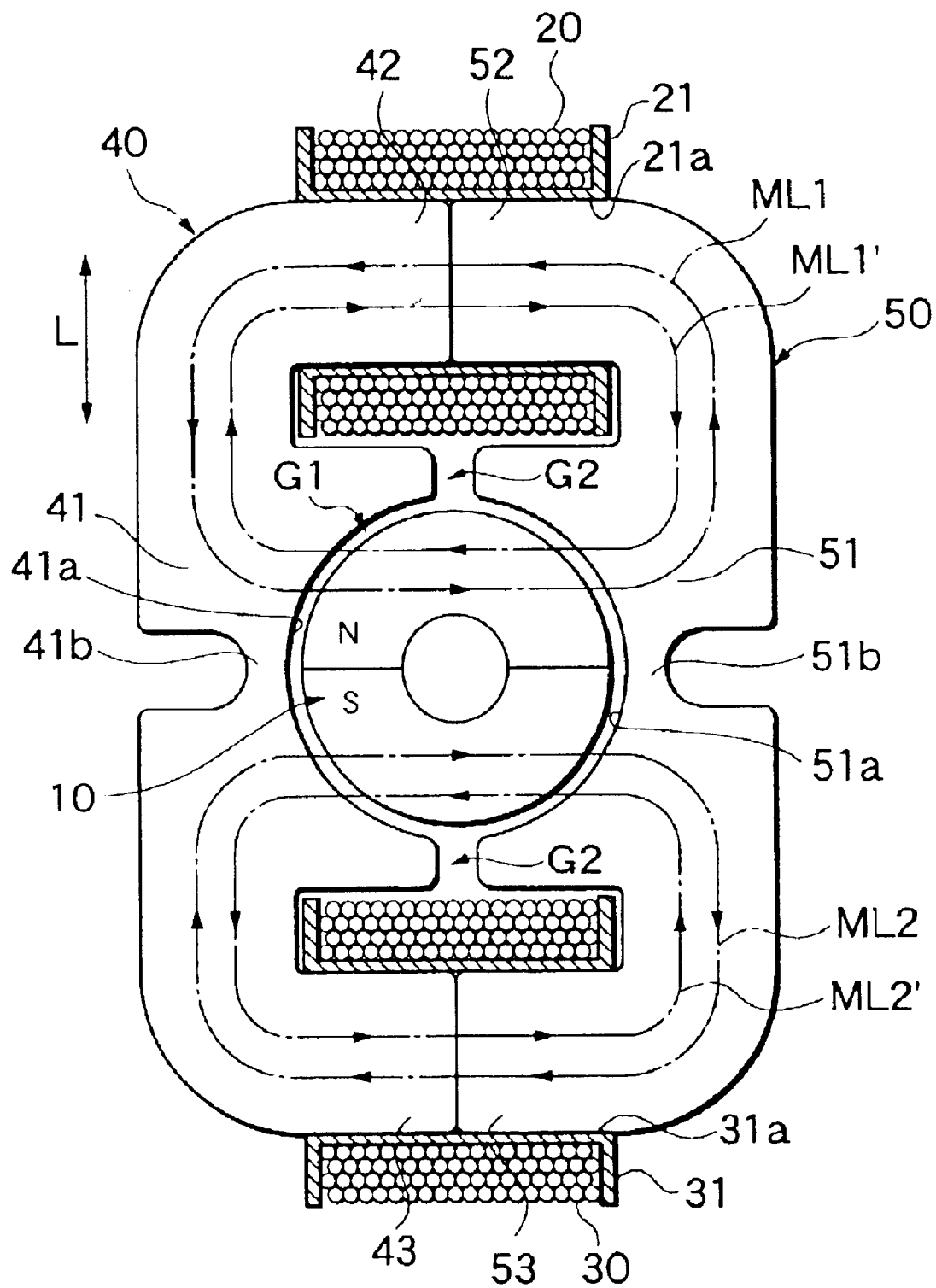
FIG. 3 is a lateral cross-sectional view of the electromagnetic actuator.

FIGS. 1 to 3 show an embodiment of an electromagnetic actuator in accordance with the present invention.

As shown in FIG. 1, the electromagnetic actuator related to the embodiment includes a rotatable rotor 10 magnetized with different polarities, a first exciting coil 20, a second exciting coil 30, a first yoke 40 and a second yoke 50 forming a magnetic circuit and so on.

As shown in FIGS. 1 and 2, the rotor 10 is composed of a magnetized portion 10a that is shaped like a disk with thickness Hr and magnetized with different polarities, and an output portion 10b that outputs a rotary driving force externally. As shown in FIGS. 1 and 2A, the magnetized portion 10a is divided into two parts by the plane passing the rotation axis (center axis) Sf. One part is magnetized as the north pole and the other is magnetized as the south pole, and a hole 10a' is formed in the middle section therebetween. As shown in FIG. 2B, the output portion 10b is formed in such a manner that its part is inserted into the hole 10a' and rotates together with the magnetized portion 10a, that is, formed as a drive pin 10b connected with a driven member (not shown in the drawing) to which driving force is applied at the position deviated by the specified distance from the rotation axis Sf.

Herein, the drive pin 10b provided at the position deviated from the rotation axis Sf is shown as the output portion, but the configuration is not limited to the drive pin. If a shaft (not shown in the drawing) is inserted into the hole 10a', the shaft itself can be used as a driving shaft.

The configuration is made in such a manner that the total size (Hr+Ho) of the thickness Hr of the magnetized portion 10a and the thickness (height) Ho of the output portion 10b can be minimized as much as possible while the function of the output portion is secured.

As shown in FIGS. 1 and 3, the first yoke 40 is a flat plate-like yoke with thickness Hy elongating in the arrow direction L. The first yoke 40 is provided with the first magnetic pole part 41 in its substantially middle area and the joints 42 and 43 located on both sides of the first magnetic pole part 41 and is formed in substantially E-shape as a whole.

In the first magnetic pole part 41, the opposite surface 41a opposed to the rotor 10 is formed in substantially semi-cylindrical shape and the constricted portion 41b is formed in the area corresponding to the center of the circumference direction of the opposite surface 41a. At the constricted portion 41b, the cross section as a magnetic path is narrowed down (small) compared with the other portions, thereby making it difficult for magnetic flux to pass through the constricted portion.

As shown in FIGS. 1 and 3, the second yoke 50 is a flat plate-like yoke with thickness Hy elongating in the arrow direction L. The second yoke 50 is provided with the second magnetic pole part 51 in its substantially middle area and the joints 52 and 53 located on both sides of the second magnetic pole part 51 and is formed in substantially E-shape as a whole.

In the second magnetic pole part 51, the opposite surface 51a opposed to the rotor 10 is formed in substantially semi-cylindrical shape and the constricted portion 51b is formed in the area corresponding to the center of the circumference direction of the opposite surface 51a. At the constricted portion 51b, the cross section as a magnetic path is narrowed down (small) compared with the other portions, thereby making it difficult for magnetic flux to pass through the constricted portion.

The first yoke 40 and the second yoke 50 are made in an identical shape and is designed to form a ring-shaped magnetic circuit by bringing the end face 42a of the joint 42 in contact with the end face 52a of the joint 52 and by bringing the end face 43a of the joint 43 in contact with the end face 53a of the joint 53.

As shown above, the efficiency in assembling the first coil 20, the second coil 30 and rotor 10 can be improved by forming a plate-like yoke that forms a magnetic circuit with the first yoke 40 and the second yoke 50 obtained by dividing the plate-like yoke in the direction substantially perpendicular to the rotation axis Sf of the rotor 10. The number of part types can be decreased and the management cost can also be reduced by making the first yoke 40 and the second yoke 50 in an identical shape.

Furthermore, the thickness Hy of the first yoke 40 and the second yoke 50 is substantially equal to the thickness Hr of the magnetized portion 10a of the rotor 10. In other words, useless portions that receive no effect of magnetic force can be eliminated by opposing the outer peripheral surface of the rotor 10 (magnetized portion 10a) to the opposite surfaces 41a and 51a in a substantially equal width. By this method, the entire electromagnetic actuator can be thinned while necessary effect of magnetic force is secured.

The first coil 20 is wound around a first bobbin 21. As shown in FIG. 1, the first bobbin 21 has a rectangular hole 21a to accept the joint 42 and joint 52. The hole 21a is formed in such a manner that its cross section becomes long and rectangular in the arrow direction L.

In other words, the first coil 20 is wound in such a manner that it becomes flat in the same direction (arrow direction L) as the plate-like yoke (first yoke 40 and second yoke 50) and that its wire extends in the elongating direction (arrow direction L) of the yoke (that is, lines of magnetic force that pass through the first coil 20 pass through the plate-like yoke and are generated in the direction crossing substantially perpendicular to the elongation direction (arrow L)).

The second coil 30 is wound around a second bobbin 31. As shown in FIG. 1, the second bobbin 31 has a rectangular hole 31a to accept the joint 43 and joint 53. The hole 31a is formed in such a manner that its cross section becomes long and rectangular in the arrow direction L.

In other words, the second coil 30 is wound in such a manner that it becomes flat in the same direction (arrow direction L) as the plate-like yoke (first yoke 40 and second yoke 50) and that its wire extends in the elongating direction (arrow direction L) of the yoke (that is, lines of magnetic force that pass through the second coil 30 pass through the plate-like yoke and are generated in the direction crossing substantially perpendicular to the elongation direction (arrow L)).

In other words, in the condition under which the rotor 10, the first yoke 40, the second yoke 50, the first coil 20 and the second coil 30 are assembled, as shown in FIG. 3, the first coil 20 and the second coil 30 are arranged opposite each other sandwiching the rotor 10, the first magnetic pole part 41 and the second magnetic pole part 51 are positioned opposite each other in the direction substantially perpendicular to the direction (arrow direction L) that the first coil 20 and second coil 30 are opposed to each other, the constricted portions 41b and 51b are positioned on the plane passing through the center axis S of the rotor 10 and at substantially middle section of the elongating direction (arrow L) of the first magnetic pole part 41 and the second magnetic pole part 51, a ring gap G1 with the specified width is formed between the cylindrical opposite surfaces 41a and 51a and the rotor 10 and an end face gap G2 is formed on both sides of the opposite surfaces 41a and 51a.

Therefore, as shown in FIG. 3, the direction of lines (ML1, ML1') of magnetic force generated by the first coil 20 and the direction of lines (ML2, ML2') of magnetic force generated by the second coil 30 have a substantially symmetrical effect on the rotor 10.

Figure 4:
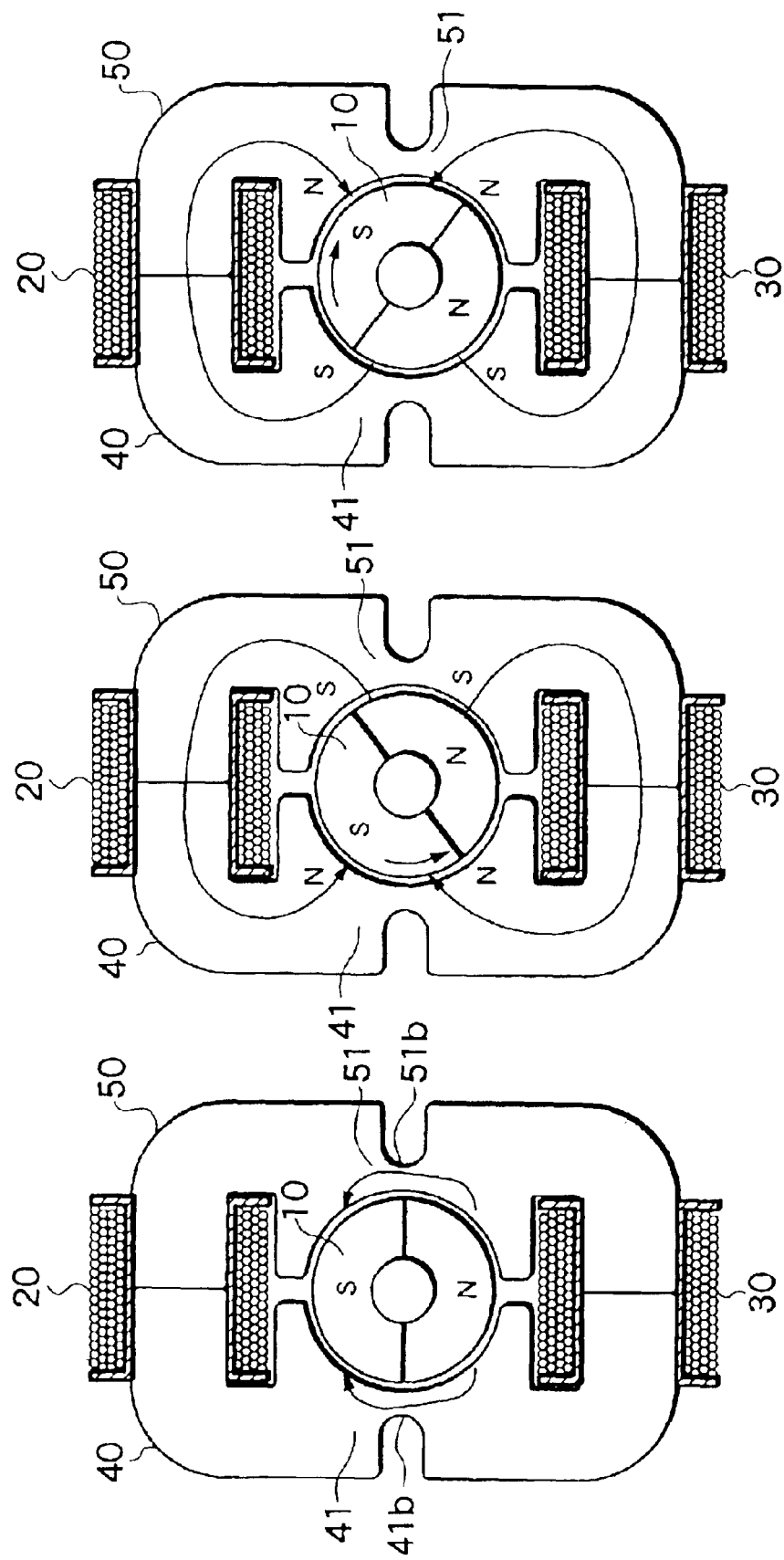
FIGS. 4A, 4B and 4C are operational views that explain the operation of the electromagnetic actuator.

Next, the operation of the electromagnetic actuator is explained on the basis of FIGS. 4A to 4C. Under the condition that current is not supplied for the first coil 20 and the second coil 30, lines of magnetic force (magnetic flux) emitted from the north(N) pole of the rotor 10 enter the south(S) pole though the constricted portion 41b of the first magnetic pole part 41 and lines of magnetic force emitted from the north(N) pole enter the south(S) pole through the constricted portion 51b of the second magnetic pole part 51, and the rotor 10 stops due to the north(N) and south(S) poles at the position splitting the first magnetic pole part 41 and the second magnetic pole part 51 by half, as shown in FIG. 4A.

Under the condition shown in FIG. 4A, when current is supplied for the first coil 20 and second coil 30 for the specified direction, the north(N) pole is generated in the first magnetic pole part 41 and the south(S) pole is generated in the second magnetic pole part 51, the rotor 10 starts rotating counterclockwise and stops at a maximum of 90 degrees as a rotation angle, as shown in FIG. 4B.

On the other hand, under the condition shown in FIG. 4A, when current is supplied for the first coil 20 and the second coil 30 for the reverse direction, the south(S) pole is generated in the first magnetic pole part 41 and the north (N) pole is generated in the second magnetic pole part 51, the rotor 10 starts rotating clockwise and stops at a maximum of 90 degrees as a rotation angle, as shown in FIG. 4C.

Figure 5:
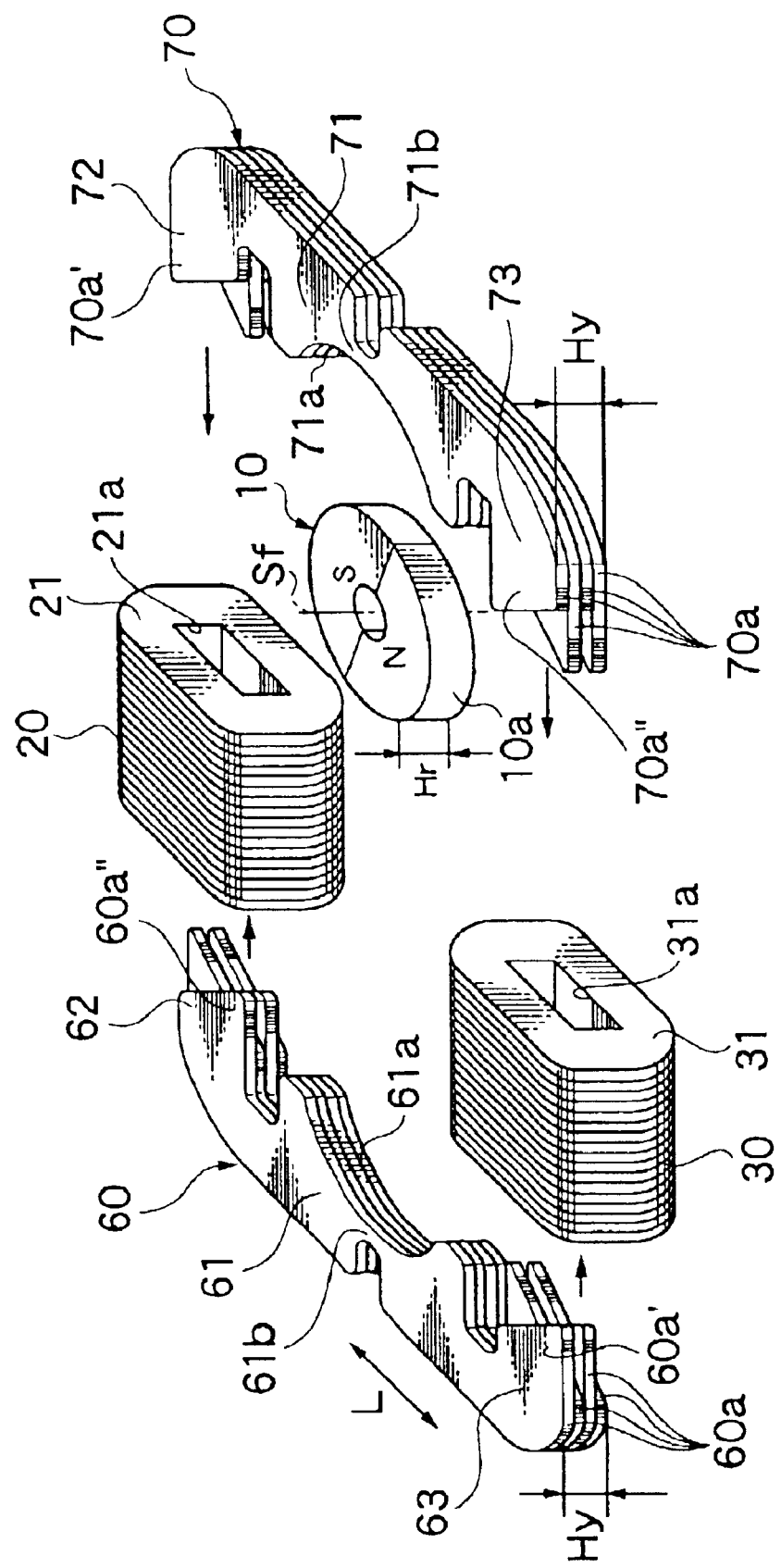
FIG. 5 is an exploded perspective view that shows another embodiment of an electromagnetic actuator in accordance with the present invention.
Figure 6:
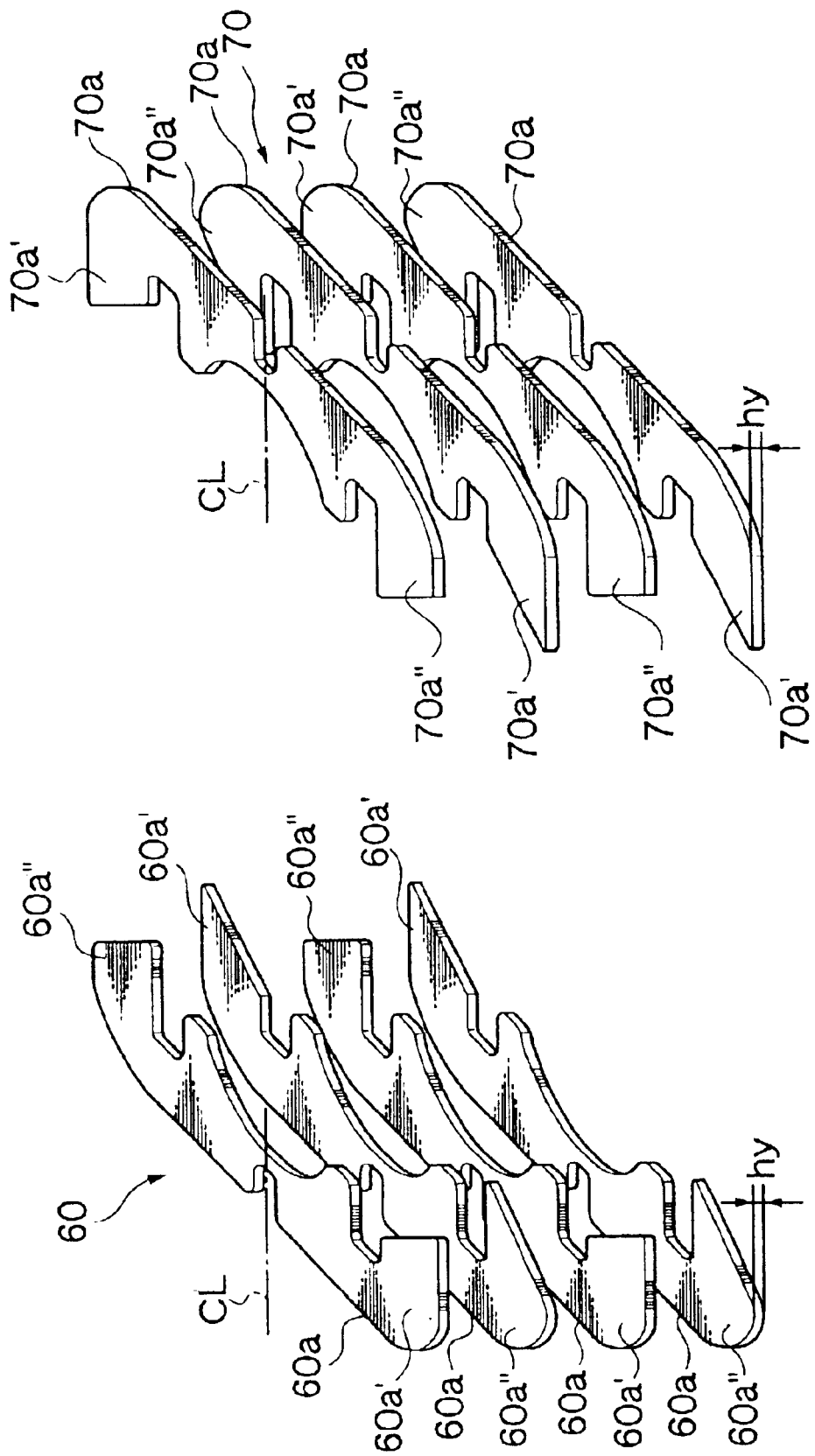
FIG. 6 is an exploded perspective view that shows yokes composing the electromagnetic actuator shown in FIG. 5.
Figure 7:
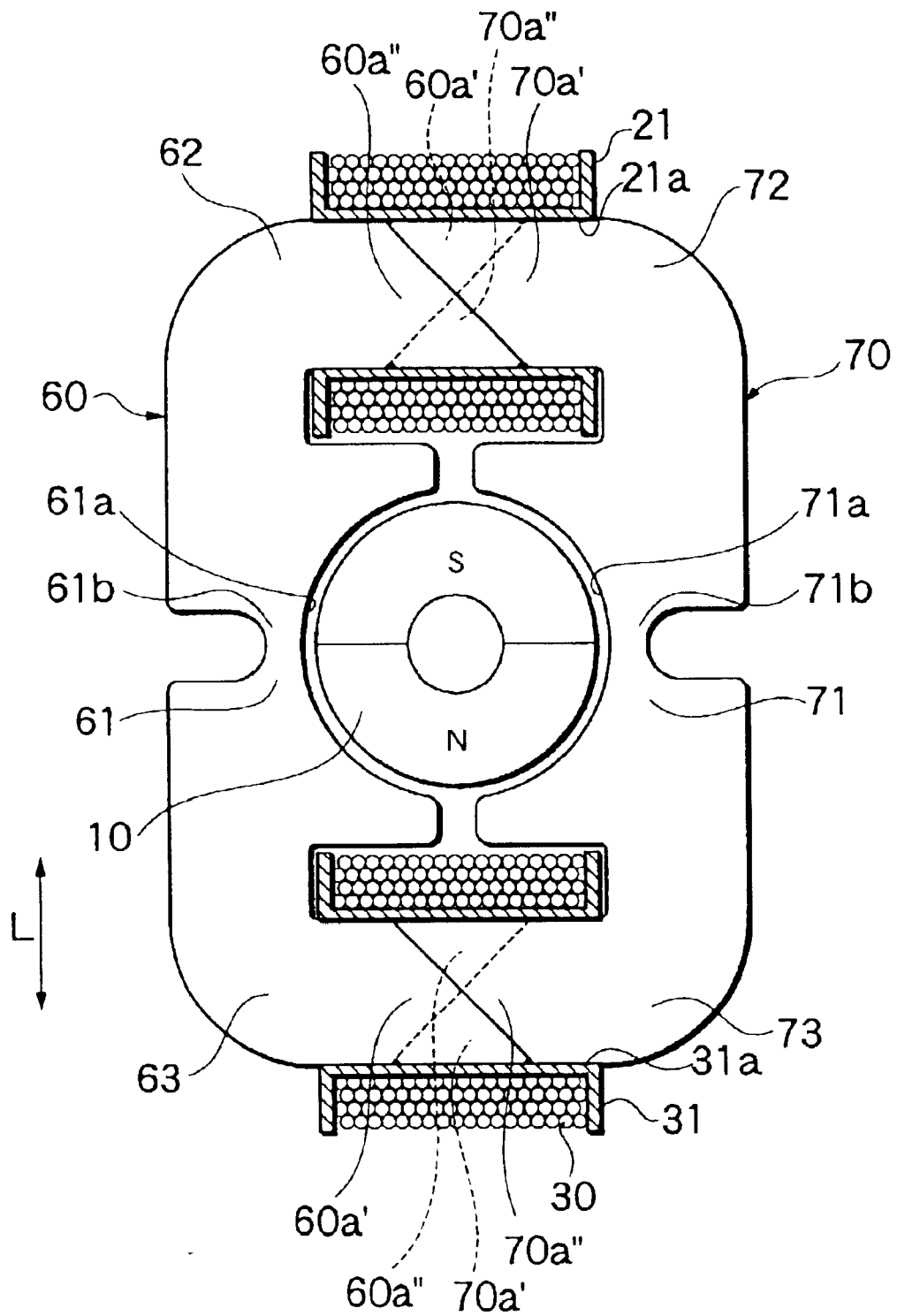
FIG. 7 is a plan view of the electromagnetic actuator shown in FIG. 5.

FIGS. 5 to 7 show another embodiment of the electromagnetic actuator in accordance with the present invention. The configuration is the same as that of the embodiment except that changes are made on the first and second yokes. Therefore, description of the same configuration as with the embodiment is omitted by attaching the same reference characters.

In the electromagnetic actuator related to this embodiment, the plate-like yoke is formed as a laminate with magnetic plates in the direction of the rotation axis Sf of the rotor 10, as shown in FIG. 5.

As shown in FIGS. 5 and 6, the first yoke 60 that forms a part of the yoke is a laminate with four magnetic plates 60a with thickness hy in the direction of the rotation axis Sf of the rotor 10. The first yoke 60 forms a flat plate-like yoke with thickness Hy elongating in the arrow direction L as a whole.

As shown in FIGS. 5 and 7, in the lamination condition, the first yoke 60 is provided with the first magnetic pole part 61 in its substantially middle area and the joints 62 and 63 located on both sides thereof and is formed in substantially E-shape as a whole.

In the first magnetic pole part 61, the opposite surface 61a opposed to the rotor 10 is formed in substantially semi-cylindrical shape and the constricted portion 61b is formed in the area corresponding to the center of the circumference direction of the opposite surface 61a. At the constricted portion 61b, the cross section as a magnetic path is narrowed down (small) compared with the other portions, thereby making it difficult for magnetic flux to pass through the constricted portion.

Furthermore, the four magnetic plates 60a forming the first yoke 60 are of the same shape, and one end 60a' and the other end 60a'' of each plate are formed asymmetrically to the center line CL, that is to say, formed as slope end faces slanting in the same direction, as shown in FIGS. 5 and 6. As shown in FIG. 6, the four magnetic plates 60a are laminated so that one end 60a' and the other end 60a'' are laid alternately. As a result, in the first yoke 60, a gap hy is formed between the laid magnetic plates 60a at the joints 62 and 63.

As shown in FIGS. 5 and 6, the second yoke 70 that forms another part of the yoke is a laminate with four magnetic plates 70a with thickness hy in the direction of the rotation axis Sf of the rotor 10. The second yoke 70 forms a flat plate-like yoke with thickness Hy elongating in the arrow direction L as a whole.

As shown in FIGS. 5 and 7, in the lamination condition, the second yoke 70 is provided with the second magnetic pole part 71 in its substantially middle area and the joints 72 and 73 located on both sides thereof and is formed in generally substantially E-shape.

In the second magnetic pole part 71, the opposite surface 71a opposed to the rotor 10 is formed in substantially semi-cylindrical shape and the constricted portion 71b is formed in the area corresponding to the center of the circumference direction of the opposite surface 71a. At the constricted portion 71b, the cross section as a magnetic path is narrowed down (small) compared with the other portions, thereby making it difficult for magnetic flux to pass through the constricted portion.

Furthermore, the four magnetic plates 70a forming the second yoke 70 are of the same shape, and one end 70a' and the other end 70a'' of each plate are formed asymmetrically to the center line CL, that is to say, formed as slope end faces slanting in the same direction, as shown in FIGS. 5 and 6. As shown in FIG. 6, the four magnetic plates 70a are laminated so that one end 70a' and the other end 70a'' are laid alternately. As a result, in the second yoke 70, a gap hy is formed between the laid magnetic plates 70a at the joints 72 and 73.

Herein, as the magnetic plates 60a and 70a are formed in the same shape, the first yoke 60 and the second yoke 70 formed by the lamination are the same in shape. In other words, when the first yoke 60 is turned by 180 degrees, it corresponds to the second yoke 70.

As shown in FIG. 7, the first yoke 60 and the second yoke 70 form a ring-shaped magnetic circuit by engaging the joints 62 and 63 with the joints 72 and 73, respectively, in such a way that magnetic plates 60a and 70a (planes thereof)

are in contact with each other and laid alternately in the direction of the rotation axis Sf of the rotor 10.

As shown above, the efficiency in assembling the first coil 20, the second coil 30 and the rotor 10 can be improved by forming a plate-like yoke forming a magnetic circuit with the two-divided first and second yokes 60, 70. The number of part types can be decreased and the management cost can also be reduced by making the first yoke 60 and the second yoke 70 or the laminating magnetic plates 60a and 70a in an identical shape.

Furthermore, since the first yoke 60 and the second yoke 70 are engaged with each other by laminating them in the direction of the rotation axis Sf of the rotor 10, a sufficient joint area can be obtained although the magnetic plates 60a and 70a are thin. By this method, the joint strength of the divided first yoke 60 and second yoke 70 can be increased and the magnetic efficiency on the interface can also be enhanced while the yoke is thinned.

Furthermore, the thickness Hy of the first yoke 60 and the second yoke 70 is substantially equal to the thickness Hr of the magnetized portion 10a of the rotor 10. In other words, useless portions that receive no effect of magnetic force can be eliminated by opposing the outer peripheral surface of the rotor 10 (magnetized portion 10a) to the opposite surfaces 61a and 71a in a substantially equal width. By this method, the entire electromagnetic actuator can be thinned while necessary effect of magnetic force is secured as in the embodiment.

In the electromagnetic actuator related to the above-mentioned embodiment, a two-divided plate-like yoke is adopted, but it is not limited to two-divided. A single yoke may be formed or a multiple-divided yoke may also be used.

As the rotor 10, a rotor with its magnetized portion 10a and output portion 10b formed separately and integrated as one body thereafter is shown, but it is not limited to such a rotor, and a one-piece formed rotor can also be adopted.

The configuration in which the joints 42, 52, 43 and 53 of the first yoke 40 and the second yoke 50 are connected to each other by coming the end faces 42a and 52a in contact with the end faces 43a and 53a, respectively, is shown. However, it is not limited to such configuration. The configuration in which the joint surfaces are formed as slope planes and come in contact with each other to produce a wedge effect can be adopted. In this case, the joint strength is increased.

In the same manner as with the joints 62, 72, 63 and 73 of the laminated first yoke 60 and second yoke 70, the joints 42 and 43 may be come in contact with the joints 52 and 53,respectively, on the planes overlapping in the direction of the rotation axis Sf of the rotor 10. In this case, the magnetic efficiency on the interface can be increased while the yoke is thinned.

As described above, the electromagnetic actuator in the present invention is composed of a rotor, an exciting coil and a yoke forming a magnetic circuit. The yoke is formed into a flat plate-like yoke that has a first magnetic pole part and a second magnetic pole part each opposed to the outer peripheral surface of the rotor, and the coil is composed of a first coil and a second coil wound in such a manner that the coils become flat in the same direction as that of the plate-like yoke, to generate different poles in the first and second magnetic pole parts when current is supplied for the coils. By this method, the actuator can be thinned (flat) while the driving force is increased.

Especially, by splitting the plate-like yoke in half, the assembly efficiency is enhanced, and the management cost can also be reduced by decreasing the number of part types as a result of the formation in an identical shape. In addition, by winding the first coil and the second coil in the joint area of the first yoke and the second yoke, for example, the bobbin, etc. to wind the coils can also serve as a joint member.

Furthermore, by forming a plate-like yoke as a laminate with a plurality of thin magnetic plates in the direction of the rotation axis of the rotor, and by making the two-divided yokes connected with each other by contacting the planes laying alternately in the direction of the rotation axis of the rotor, a sufficient joint strength can be obtained and the magnetic efficiency on the interface can also be enhanced while the yoke is thinned.

The camera shutter device in accordance with the present invention is described hereunder.

FIGS. 8 to 11 show an embodiment of a focal-plane type camera shutter device as the camera shutter device.

Figure 8:
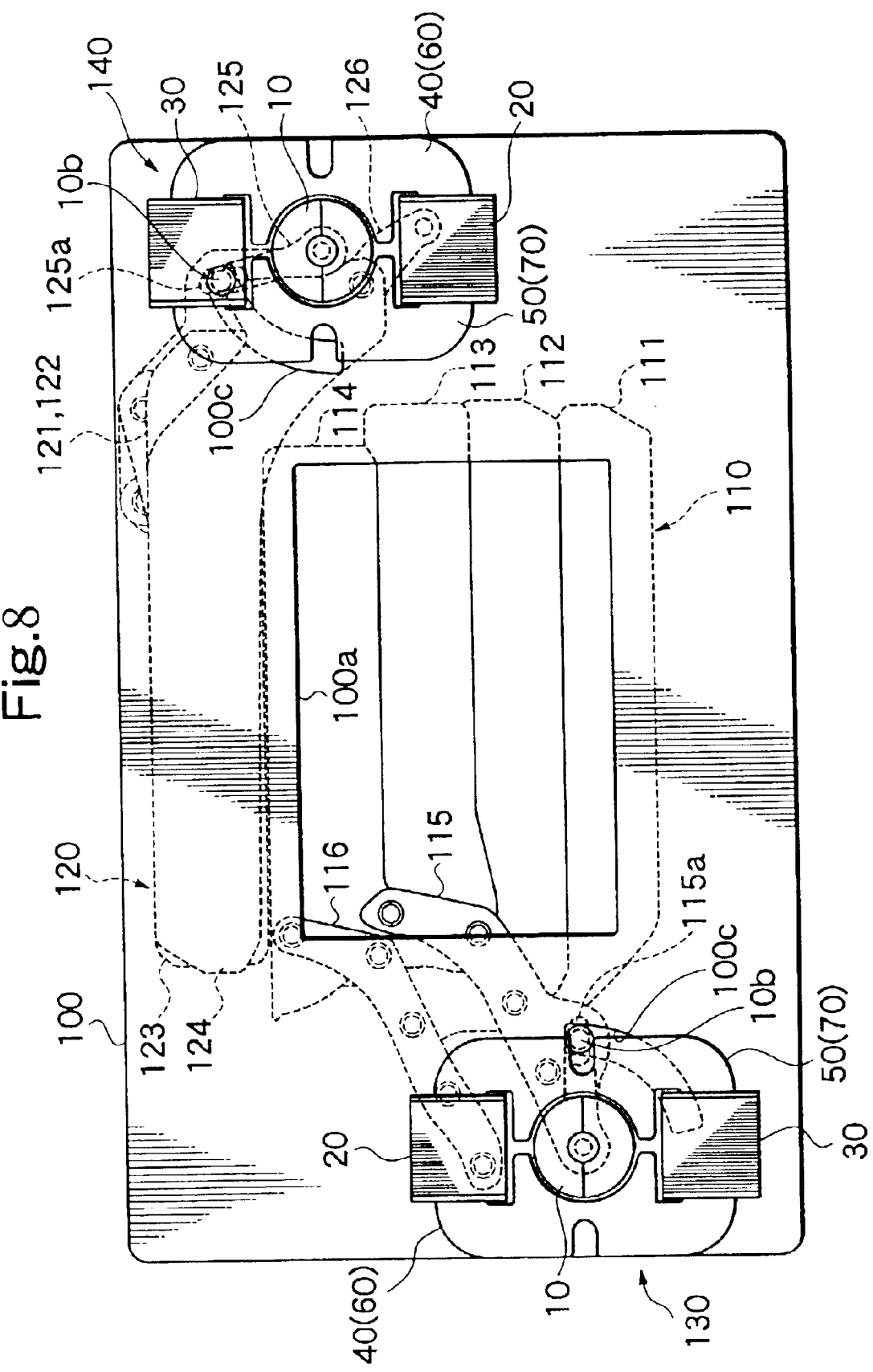
FIG. 8 is a plan view that shows an embodiment of a camera shutter device in accordance with the present invention.

As shown in FIG. 8, this camera shutter device includes a base plate 100 having an aperture 100a for exposure, a before-moving blade 110 and an after-moving blade 120 that serve as a shutter blade to open and close the aperture 100a, a first electromagnetic actuator 130 arranged on the left side of the aperture 100a to drive the before-moving blade 110 and a second electromagnetic actuator 140 arranged on the right side of the aperture 100a to drive the after-moving blade 120.

Figure 9:
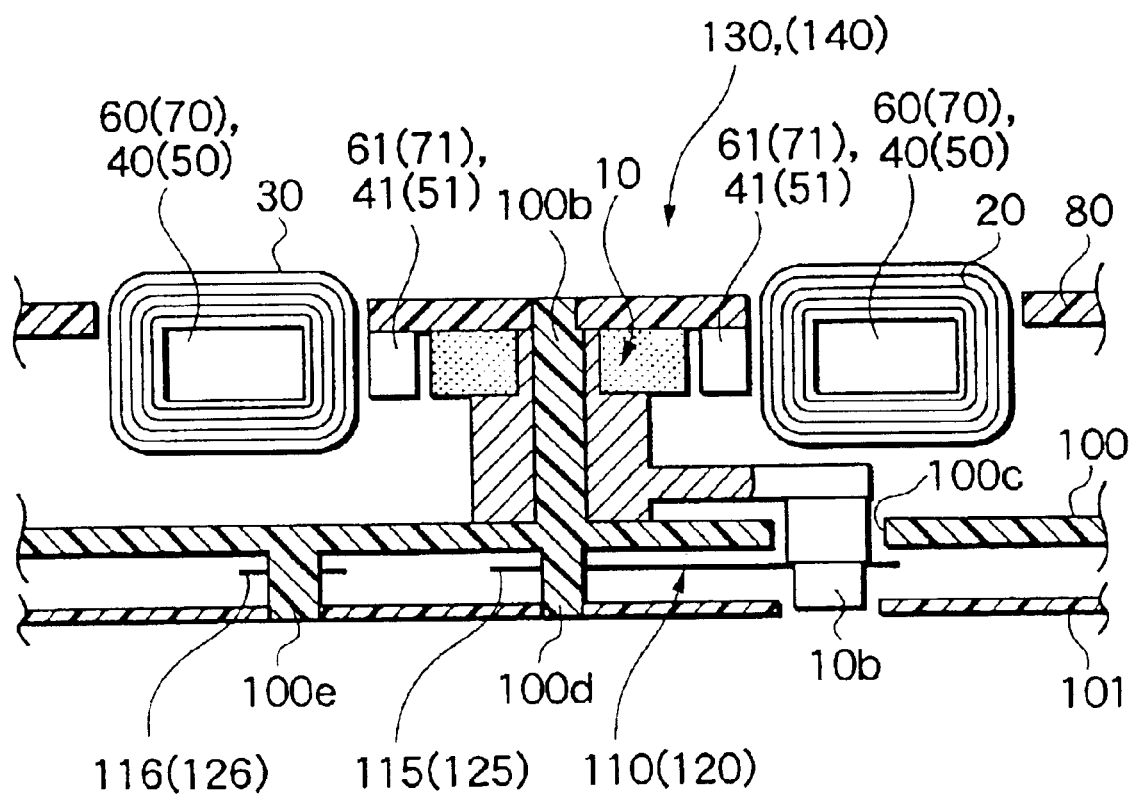
FIG. 9 is a cross-sectional view of the camera shutter device shown in FIG. 8.

The first electromagnetic actuator 130 and the second electromagnetic actuator 140 have the same configuration as that of the electromagnetic actuator shown in FIGS. 1 to 4, or 5 to 7. As shown in FIG. 9, a rotor 10 is supported to rotate freely by a support shaft 100b made of a portion protruding from the base plate 100, and a first yoke 40 (or a first yoke 60) and a second yoke 50 (or a second yoke 70) are supported by a support plate 80 fixed to the base plate 100. As shown in FIGS. 8 and 9, a drive pin 10b that is an output portion of the rotor 10 is connected to the drive arms 115 and 125 of the before-moving blade 110 and the after-moving blade 120, respectively, arranged between the base plate 100 and a cover plate 101 through an arc guide hole 100c.

As shown in FIG. 8, the before-moving blade 110 as a shutter blade is composed of blades 111, 112, 113 and 114 (4 pieces according to this configuration), a drive arm 115 and a support arm 116 that connect the blades 111, 112, 113 and 114 to rotate these blades freely. The drive arm 115 and the support arm 116 are supported to rotate freely by support shafts 100d and 100e formed on the rear face of the base plate 100.

The drive pin 10b of the first electromagnetic actuator 130 is connected to a long hole 115a in the drive arm 115. When the rotor 10 rotates within the range of substantially 90 degrees, the drive arm 115 and the support arm 116 move back and forth with the before-moving blade 110 and make substantially linear reciprocating motion between the opened position in which the before-moving blade 110 overlaps at the under side and opens the aperture 100a and the closed position (see FIG. 8) in which the before-moving blade 110 spreads out and closes the aperture 100a.

As shown in FIG. 8, the after-moving blade 120 as a shutter blade is composed of blades 121, 122, 123 and 124 (4 pieces according to this configuration), a drive arm 125 and a support arm 126 that connect the blades 121, 122, 123 and 124 to rotate these blades freely. The drive arm 125 and the support arm 126 are supported to rotate freely by support shafts 100d and 100e formed on the rear face of the base plate 100.

The drive pin 10b of the second electromagnetic actuator 140 is connected to a long hole 125a in the drive arm 125. When the rotor 10 rotates within the range of substantially 90 degrees, the drive arm 125 and the support arm 126 move back and forth with the after-moving blade 120 and make substantially linear reciprocating motion between the opened position (See FIG. 8) in which the blade 120 overlaps at the upper side and opens the aperture 100a and the closed position in which the blade 120 spreads out and closes the aperture 100a.

As shown in FIG. 8, the before-moving blade 110 has a fulcrum on the left side of the aperture 100a while the after-moving blade 120 has a fulcrum on the right side of the aperture 100a, and the first electromagnetic actuator 130 is arranged on the left side of the aperture 100a while the second electromagnetic actuator 140 is arranged on the right side of the aperture 100a.

As shown above, by using a thinned (flat) electromagnetic actuator as a drive source, the camera shutter device can be thinned. By arranging the first electromagnetic actuator 130 and the second electromagnetic actuator 140 on both sides of the aperture 100a, respectively, sandwiching the aperture 100a, and by placing, for example, the second electromagnetic actuator 140 in the portion corresponding to the film storage space, especially if the camera shutter device is mounted in a digital still camera or the like that requires no film cartridge, the camera can be further thinned and miniaturized.

Figure 10A:
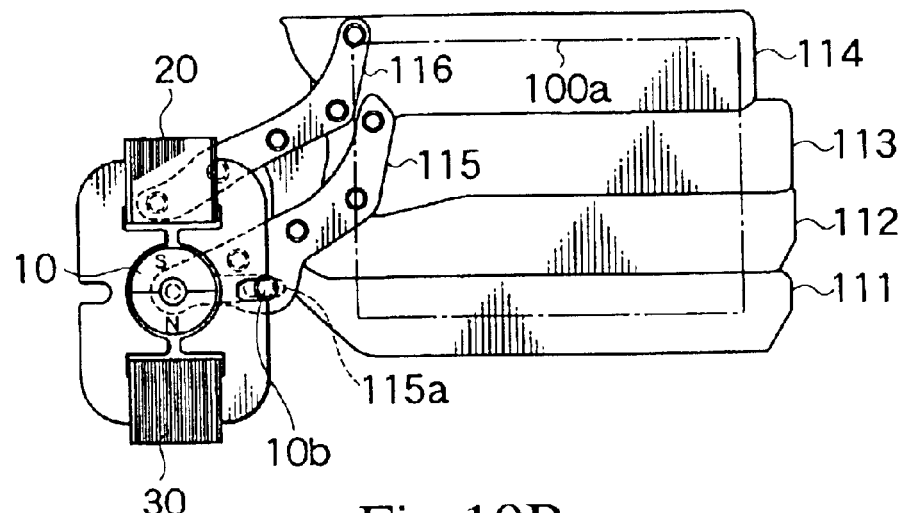
FIGS. 10A, 10B and 10C are operational views that explain the operation of the camera shutter device.
Figure 10B:
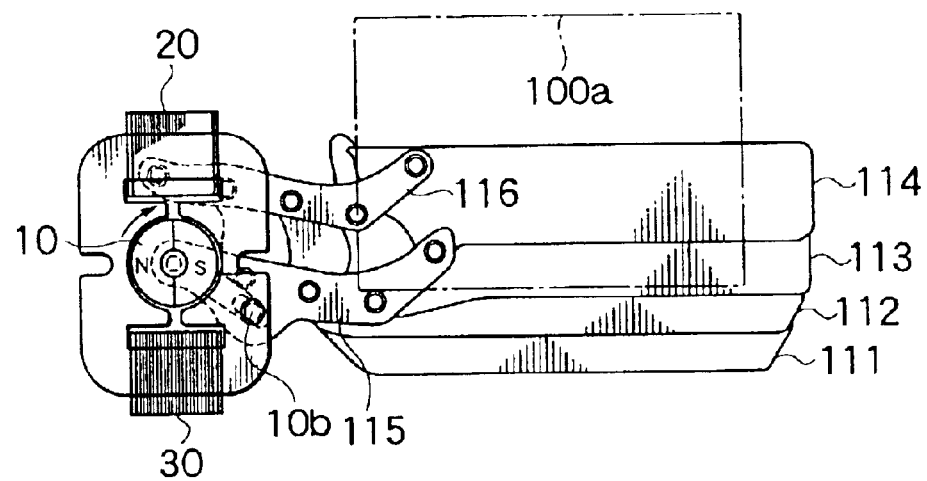
Figure 10C:
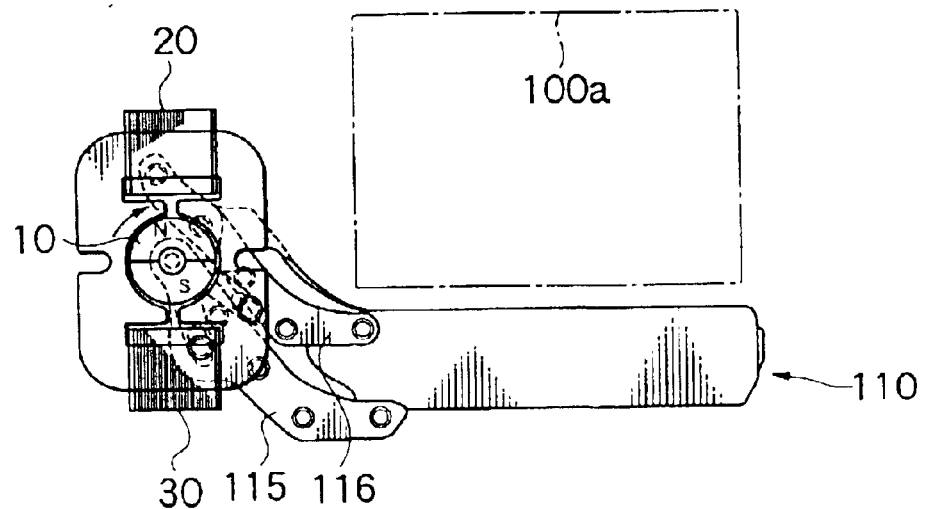

The relationship between the rotation angle position of the first electromagnetic actuator 130 and the before-moving blade 110 is set as shown in FIGS. 10A to 10C. That is, in the stop condition with no current supply, the before-moving blade 110 stays at the closed position of the aperture 100a as shown in FIG. 10A. Then, urged magnetically by the force relationship as shown in FIG. 4A, the rotor 10 stops and keeps the before-moving blade 110 at the closed position.

In this condition, when current is supplied for the first electromagnetic actuator 130 (first coil 20 and second coil 30) for the specified direction, the rotor 10 turns clockwise, and opens the aperture 100a by substantially half only at substantially 45 degrees as shown in FIG. 10B. By further current supply, the rotor 10 turns clockwise by another 45 degrees, and the before-moving blade 110 reaches the opened position of the aperture 100a as shown in FIG. 4A.

At this opened position, even if current supply for the first electromagnetic actuator 130 is cut off, urged magnetically by the force relationship as shown in FIG. 4A, the rotor 10 stops and keeps the before-moving blade 110 at the opened position.

The relationship between the rotation angle position of the second electromagnetic actuator 140 and the after-moving blade 120 is the same as above. In the stop condition with no current supply, the after-moving blade 120 stays at the opened position of the aperture 100a. Then, urged magnetically by the force relationship as shown in FIG. 4A, the rotor 10 stops and keeps the after-moving blade 120 at the opened position.

In this condition, when current is supplied for the second electromagnetic actuator 140 (first coil 20 and second coil 30) for the specified direction, the rotor 10 turns counterclockwise, and closes the aperture 100a by substantially half only at substantially 45 degrees. By further current supply, the rotor 10 turns counterclockwise by another 45 degrees, and the after-moving blade 120 reaches the closed position of the aperture 100a.

At this closed position, even if current supply for the second electromagnetic actuator 140 is cut off, urged magnetically by the force relationship as shown in FIG. 4A, the rotor 10 stops and keeps the after-moving blade 120 at the closed position.

As shown above, by keeping the before-moving blade 110 and the after-moving blade 120 at the opened or closed position in the condition of no current supply, a desired shutter function can be secured while the power consumption is reduced.

The operation of the camera shutter device when it is mounted in a silver-film type camera is described hereunder by referring to the time chart shown in FIG. 11. In the standby condition for photography with the main switch of the camera turned on, the before-moving blade 110 is at the closed position and the after-moving blade 120 is at the opened position as shown in FIG. 8. Then, the respective drive pins 10b of the first electromagnetic actuator 130 and the second electromagnetic actuator 140 contact the upper end portion of the guide hole 100c to be restricted and keep the before-moving blade 110 at the closed position and keep the after-moving blade 120 at the opened position, by a magnetic holding force in the condition of no current supply.

When a user conducts a release operation in this standby condition, the first electromagnetic actuator 130 is supplied with current as shown in FIG. 11, the rotor 10 turns clockwise and the before-moving blade 110 starts moving toward the opened position.

Next, the second electromagnetic actuator 140 is supplied with current as shown in FIG. 11, following the start of the first electromagnetic actuator 130, the rotor 10 turns counterclockwise and the after-moving blade 120 starts moving toward the closed position.

When the before-moving blade 110 reaches the opened position, the current supply for the first electromagnetic actuator 130 is cut off, and when the after-moving blade 120 reaches the closed position, the current supply for the second electromagnetic actuator 140 is cut off.

Then, the respective drive pins 10b of the first electromagnetic actuator 130 and the second electromagnetic actuator 140 contact the lower end portion of the guide hole 100c to be restricted and keep the before-moving blade 110 at the opened position and keep the after-moving blade 120 at the closed position, by a magnetic holding force in the condition of no current supply.

By the movement of the before-moving blade 110 and the after-moving blade 120, the exposure operation is carried out, and the photography is completed.

Next, the first electromagnetic actuator 130 and the second electromagnetic actuator 140 are supplied with current for the reverse direction, and the before-moving blade 110 and after-moving blade 120 move again and reach the closed and opened positions, respectively, as shown in FIG. 8. Then, current supply control may be made for exposure operation. Next, current supply for the first electromagnetic actuator 130 and the second electromagnetic actuator 140 is cut off to become the standby condition for photography. The sequence is repeated in the following photography.

In this embodiment, the before-moving blade 110 and the after-moving blade 120 composed of a plurality of blades are adopted as a shutter blade. It is not always necessary, however, to make such configuration, and a thin electromagnetic actuator in accordance with the present invention may be used in the configuration of the before-moving blade and after-moving blade respectively composed of a single blade.

Figure 12:
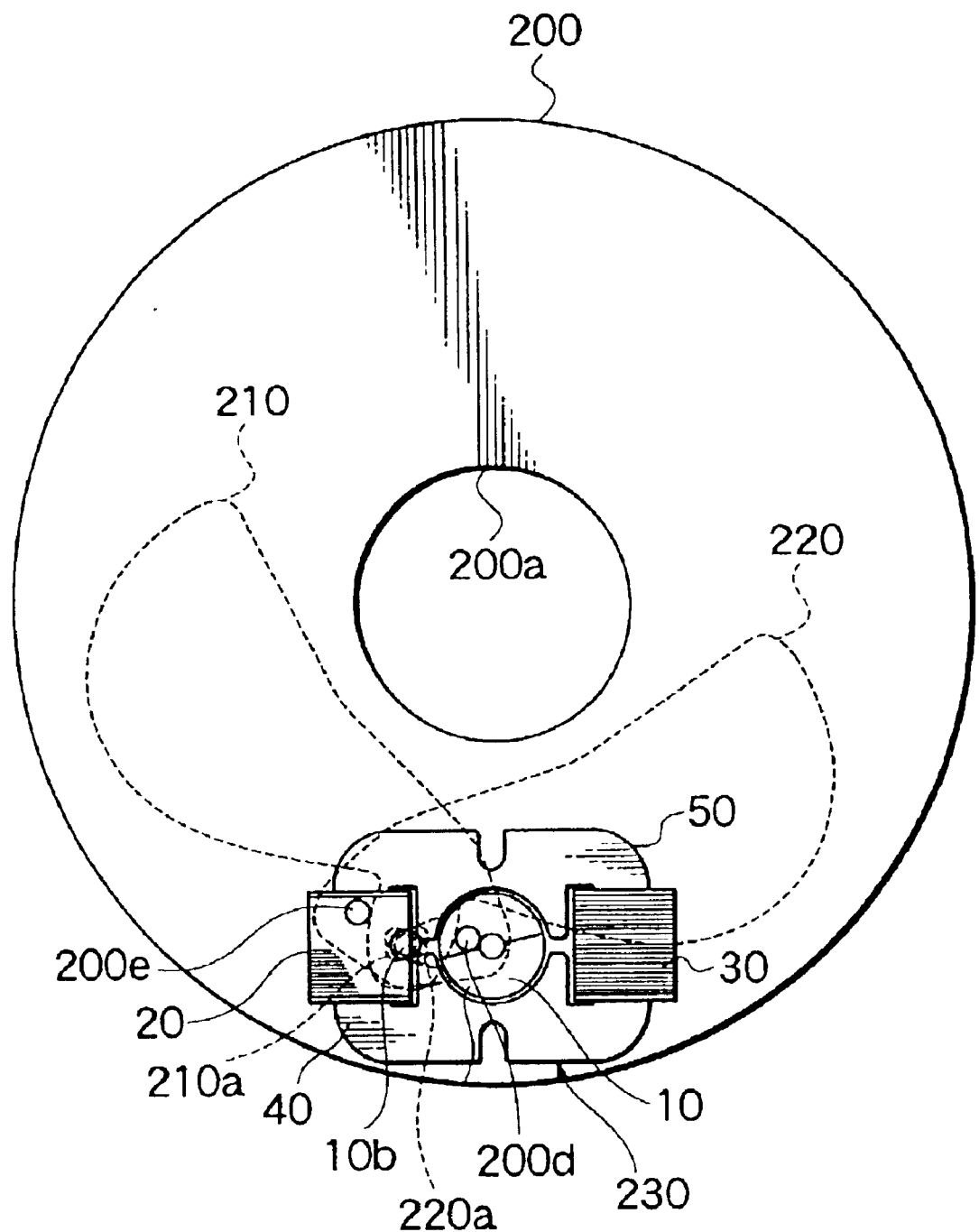
FIG. 12 is a plan view that shows another embodiment of a camera shutter device in accordance with the present invention.
Figure 13:
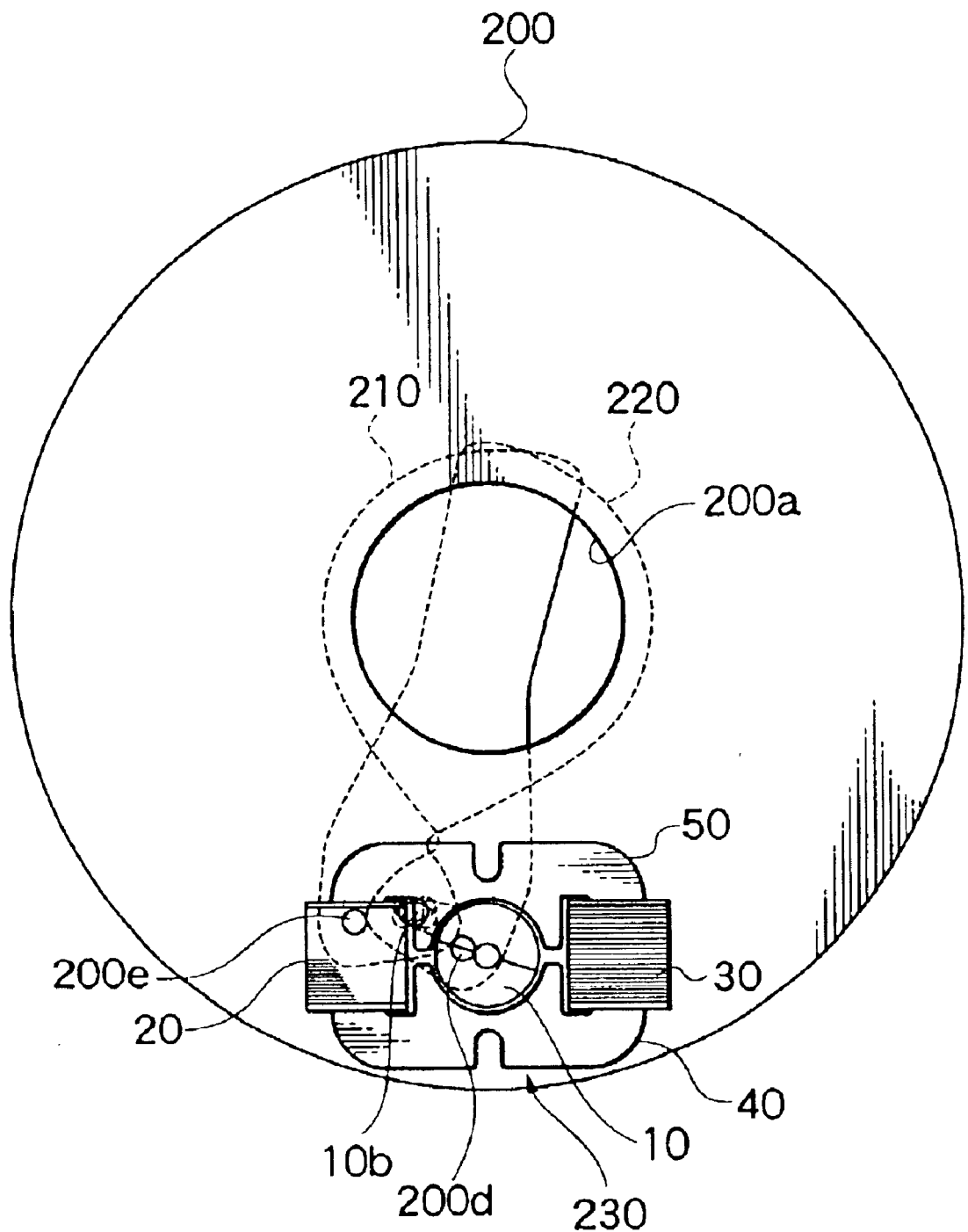
FIG. 13 is a plan view that shows still another embodiment of a camera shutter device in accordance with the present invention.

FIGS. 12 and 13 show an embodiment of the lens shutter device arranged in the lens barrel as a camera shutter device.

This lens shutter device includes a base plate 200 having an aperture 200a for exposure, a first shutter blade 210 and a second shutter blade 220 as a shutter blade to open and close the aperture 200a, and a single electromagnetic actuator 230 to drive the first shutterblade 210 and the second shutter blade 220.

The electromagnetic actuator 230 has the same configuration as the electromagnetic actuator in FIGS. 1 to 4, or FIGS. 5 to 7, and is supported by the base plate 200 in the same manner as the before-mentioned embodiment. Therefore, the description of the configuration in detail is omitted.

The first shutter blade 210 is rotatable-supported by a support shaft 200d formed on the rear face of the base plate 200, and has a long hole 210a therein to connect a drive pin 10b as shown in FIGS. 12 and 13.

The second shutter blade 220 is rotatable-supported by a support shaft 200e formed on the rear face of the base plate 200, and has a long hole 220a therein to connect a drive pin 10b as shown in FIGS. 12 and 13.

The long holes 210a and 220a of the first shutter blade 210 and the second shutter blade 220 are connected to the drive pins 10b of the electromagnetic actuator 230. When the rotor 10 turns clockwise, the first shutter blade 210 and the second shutter blade 220 move in the approaching direction to each other and reach the position to close the aperture 200a as shown in FIG. 13. On the other hand, when the rotor 10 turns counterclockwise, the first shutter blade 210 and the second shutter blade 220 move in the receding direction from each other and reach the position to open the aperture 200a as shown in FIG. 12.

By using a thin electromagnetic actuator as a drive source for the shutter blade in a lens shutter device, the thickness of the device can be thinned and the camera can be thinned by that amount. A detailed description of the operation of this lens shutter device is omitted since it is the same as those of conventional shutter devices.

As described above, by using a thin electromagnetic actuator as a drive source for the shutter blade, a camera shutter device can be thinned and a camera to be equipped with this camera shutter device can also be thinned.

Furthermore, in a camera shutter device provided with before-moving and after-moving blades as a shutter blade and electromagnetic actuators that drive the before-moving and after-moving blades independently, by arranging the respective electromagnetic actuators on both sides of the aperture for exposure sandwiching it, and especially by arranging one of the electromagnetic actuators in the portion corresponding to the storage space when the device is mounted in a digital still camera or the like that requires no storage space for film cartridge, the camera can be further thinned and miniaturized.

Figure 14:
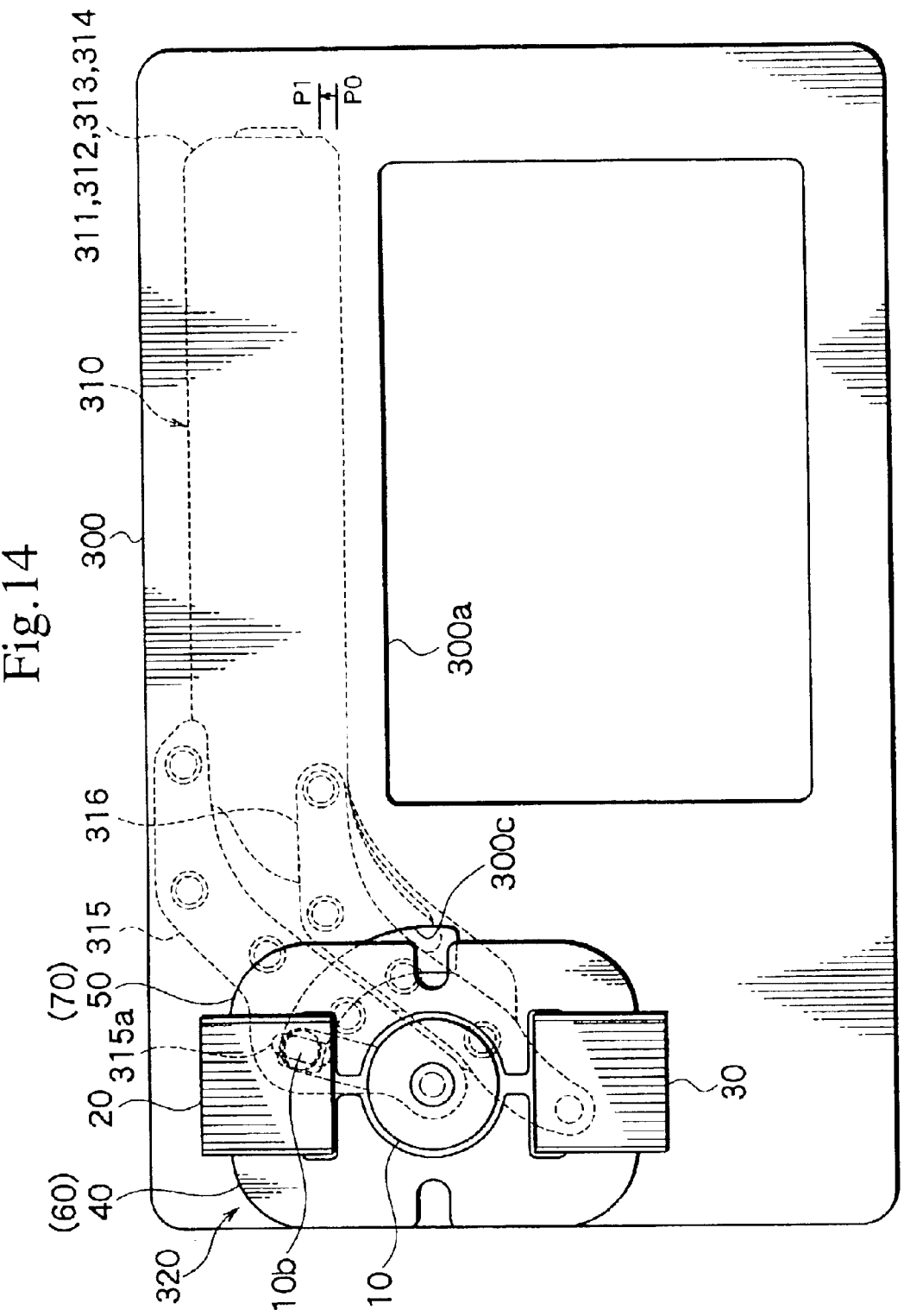
FIG. 14 is a plan view that shows still another embodiment of a camera shutter device in accordance with the present invention and illustrates the condition of the aperture opened by the shutter blade.
Figure 15:
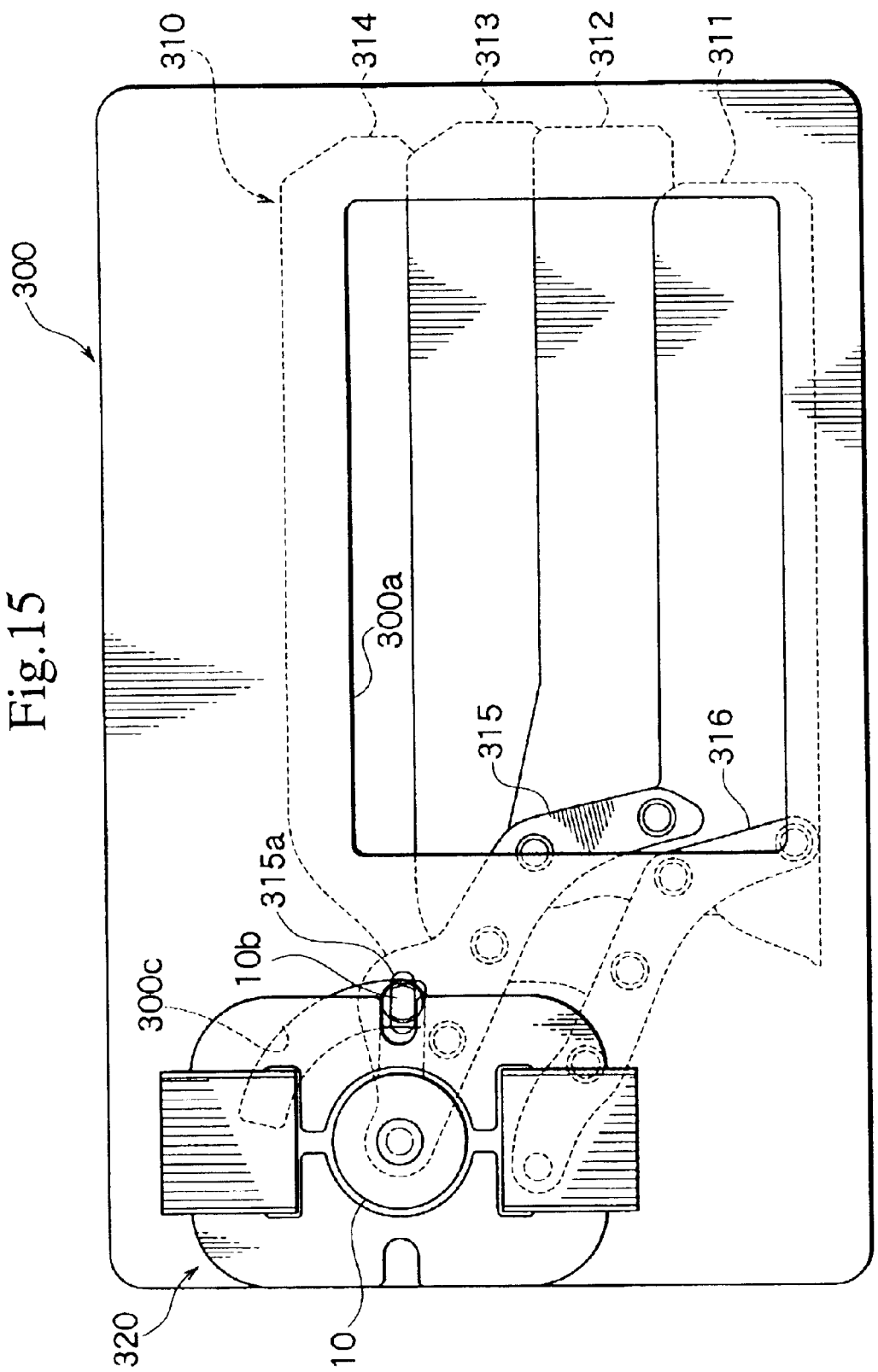
FIG. 15 is a plan view that shows the condition of the aperture closed by the shutter blade in the camera shutter device shown in FIG. 14.
Figure 16:
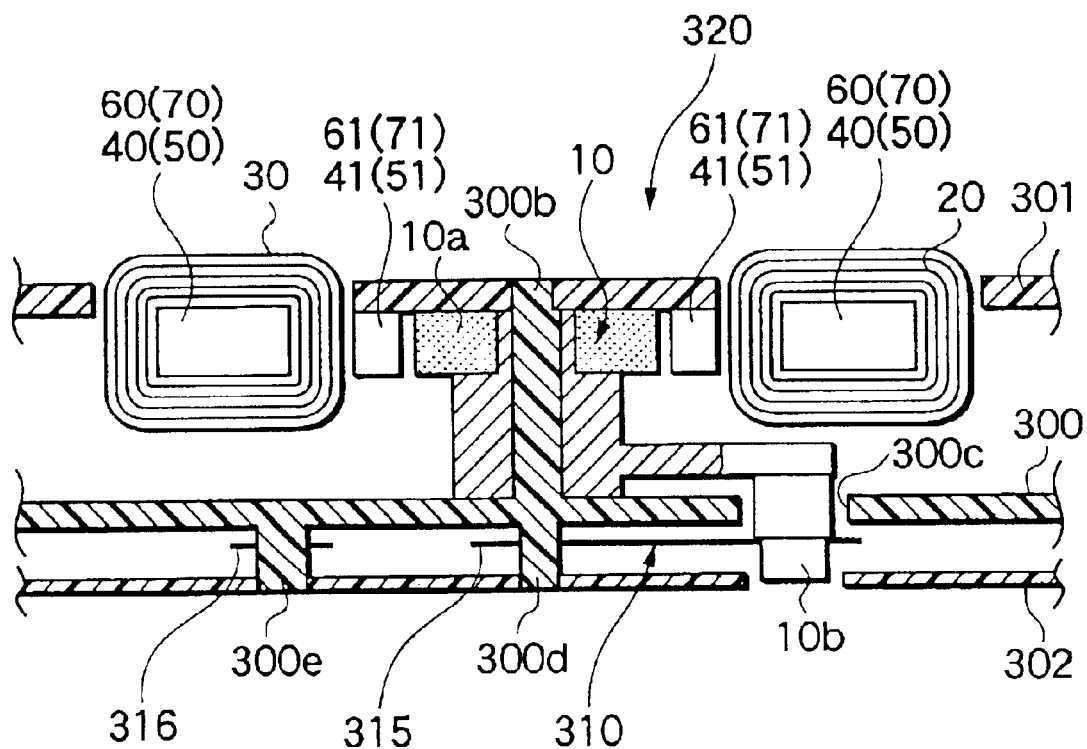
FIG. 16 is a cross-sectional view that shows the parts of the electromagnetic actuator.

FIGS. 14 to 16 show another embodiment of a camera shutter device in accordance with the present invention.

As shown in the drawing, the camera shutter device related to this embodiment includes a base plate 300 having an aperture 300a for exposure, a shutter blade 310 opening and closing the aperture 300a, an electromagnetic actuator 320 as a drive source arranged on the left side of the aperture 300a to directly drive the shutter blade 310, and a control circuit (not shown in the drawing) including a CPU to control current supply to the electromagnetic actuator 320 as a control means.

The electromagnetic actuator 320 has the same configuration as that of the electromagnetic actuator in FIGS. 1 to 4, or FIGS. 5 to 7. As shown in FIG. 16, a rotor 10 is rotatable-supported by a support shaft 300b made of a portion protruding from the base plate 300, and a first yoke 40 (or a first yoke 60) and a second yoke 50 (or a second yoke 70) are supported by a support plate 301 fixed to the base plate 300.

As shown in FIGS. 14 to 16, a drive pin 10b of the rotor 10 is connected to a part (drive arm 315 described later) of the shutter blade 310 arranged between the base plate 300 and a cover plate 302 through an arc guide hole 300c, and directly drives the shutter blade 310 when the rotor 10 rotates.

As shown in FIGS. 14 and 15, the shutter blade 310 is composed of blades 311, 312, 313 and 314 (4 pieces according to this configuration), a drive arm 315 and a support arm 316 that connect the blades 311, 312, 313 and 314 to rotate these blades freely. The drive arm 315 and the support arm 316 are supported to rotate freely by support shafts 300d and 300e formed on the rear face of the base plate 300 as shown FIG. 16.

The drive pin 10b of the electromagnetic actuator 320 is connected to a long hole 315a in the drive arm 315. When the rotor 10 rotates within the range of substantially 90 degrees, the drive arm 315 and the support arm 316 move back and forth and the blades 311, 312, 313 and 314 make substantially linear reciprocating motion between the opened position in which the blades overlap at the upper side and open the aperture 300a as shown in FIG. 14 and the closed position in which the blades spread out downward and close the aperture 300a as shown in FIG. 15.

Figure 17:
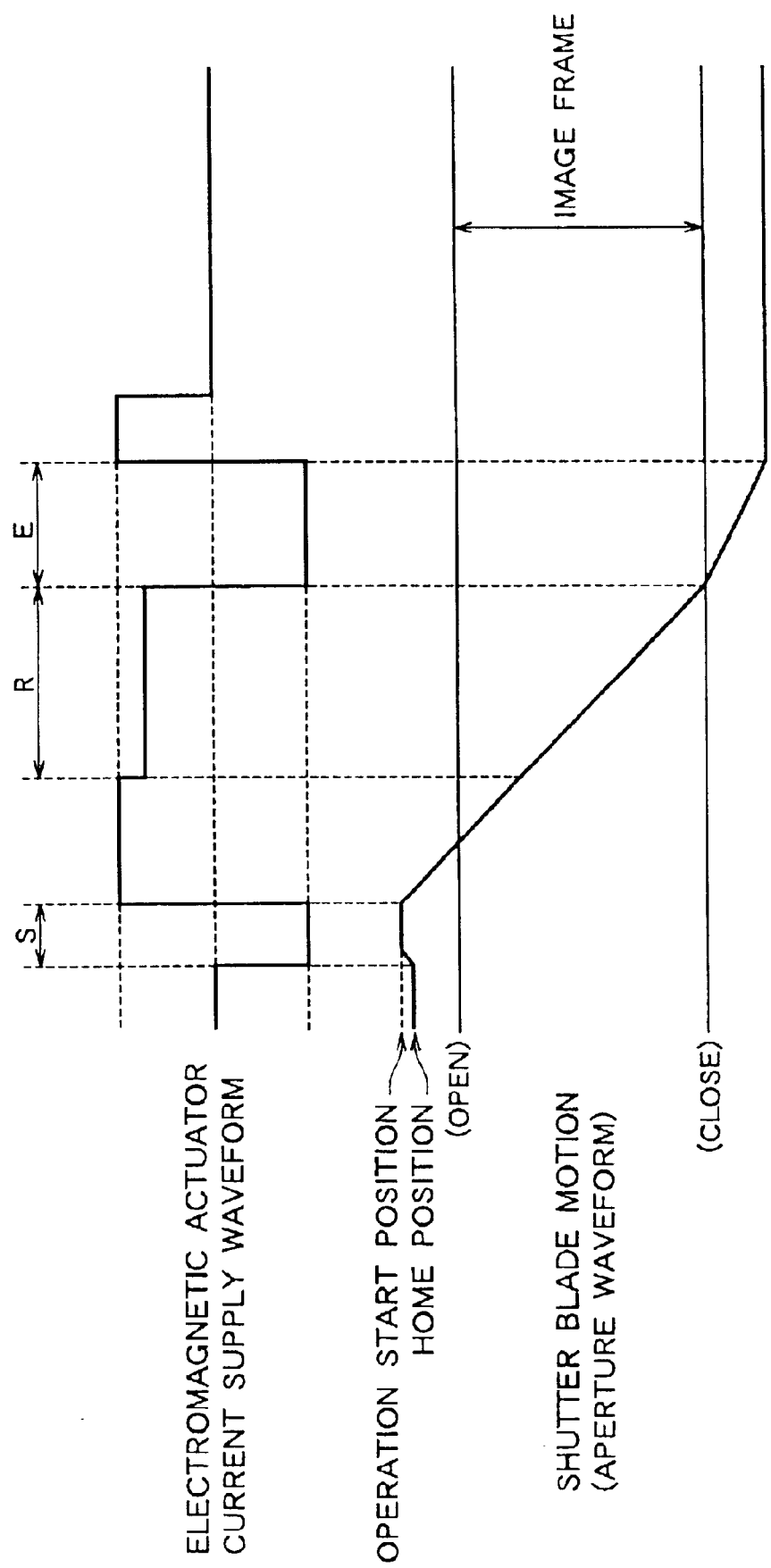
FIG. 17 is a time chart that explains a current supply control and an exposure operation in the camera shutter device shown in FIG. 14.

The operation of the camera shutter device when it is mounted in a digital still camera is described hereunder by referring to the time chart shown in FIG. 17.

In the standby condition for photography with the main switch of the camera turned on, the shutter blade 310 is at the opened position as shown in FIG. 14. Then, the pin 10b of the electromagnetic actuator 320 is located near the upper end portion of the guide hole 300c and keeps the shutter blade 310 at the opened position by balancing the magnetic holding force and the external force in the condition of no current supply.

When a user conducts a release operation in this standby condition, the control circuit supplies the electromagnetic actuator 320 with current for the direction opposite to the direction in which the shutter blade 310 moves to close as shown in area S in FIG. 17.

By this method, the shutter blade 310 is positioned from the home position P0 whereat the magnetic holding force balances the external force, to the operation start position P1 where is set primarily for exposure operation, that is, the position where the drive pin 10b contacts the upper end portion of the guide hole 300c.

As shown above, only by controlling current supply for reverse direction before the start of exposure operation, the shutter blade 310 is positioned in advance at the predetermined operation start position P1 and the exposure operation is started by a stable specified timing, and as a whole, a stable exposure operation can be performed.

Next, the control circuit supplies the electromagnetic actuator 320 with the predetermined current for the direction in which the shutter blade 310 moves to close. The rotor 10 turns clockwise and the shutter blade 310 starts moving toward the closed position at an increased speed.

As shown in the area R in FIG. 17, the control circuit supplies the electromagnetic actuator 320 with a low current so that the current value in the area where the shutter blade 310 is on the move after starting moving to close becomes smaller than the current value in the area where the shutter blade 310 starts moving.

In this way, by lowering the current when the shutter blade 310 is moving due to the inertia force, power consumption required for exposure operation can be reduced while the shutter blade 310 makes a stable movement.

Next, when the shutter blade 310 moves to close and approaches the closed position, the control circuit supplies the electromagnetic actuator 320 with current for the direction opposite to the direction in which the shutter blade 310 moves to close, immediately before the blade completes its movement, as shown in area E in FIG. 17.

As shown in FIG. 15, simultaneously when or immediately before the shutter blade 310 completely closes the aperture 300a and contacts the stopper (the stopper function is obtained when the drive pin 10b contacts the lower end portion of the guide hole 300c), the control circuit supplies the electromagnetic actuator 320 again with current for the direction in which the shutter blade 310 moves to close, and cuts off current when the shutter blade 310 securely contacts the stopper and stops.

In this way, by controlling current supply in the reverse direction immediately before the blade completes the movement, the shutter blade 310 is braked and stops promptly at the predetermined position without generating a bound phenomenon, etc. when the blade stops after hitting the stopper or the like. Therefore, the sequence time required for a single photography can be shortened and a high shutter speed can be realized.

After the shutter blade 310 stops at the closed position, the drive pin 10b of the electromagnetic actuator 320 contacts the lower end portion of the guide hole 300c and is restricted to move, thereby keeping the shutter blade 310 at the closed position by the magnetic holding force in the condition of no current supply.

The exposure operation is performed by the movement of the shutter blade 310, and then, a photographic image taken on the CCD is taken into the image storage and processing circuit, various processes are made and a single-time photography is completed.

Next, the control circuit supplies the electromagnetic actuator 320 with current for the reverse direction, and the shutter blade 310 moves to open and reaches again the opened position as shown in FIG. 14. Then, current supply for the electromagnetic actuator 320 is cut off and the standby condition for photography is ready. The sequence is repeated in the following photography.

In the exposure operation, current supply control for reverse direction in area S, low current supply control in area R, and current supply control for reverse direction in area E are all adopted. However, only one of the current supply controls can be adopted. Even in this case, the working effect corresponding to the respective current supply control can be obtained.

Figure 18:
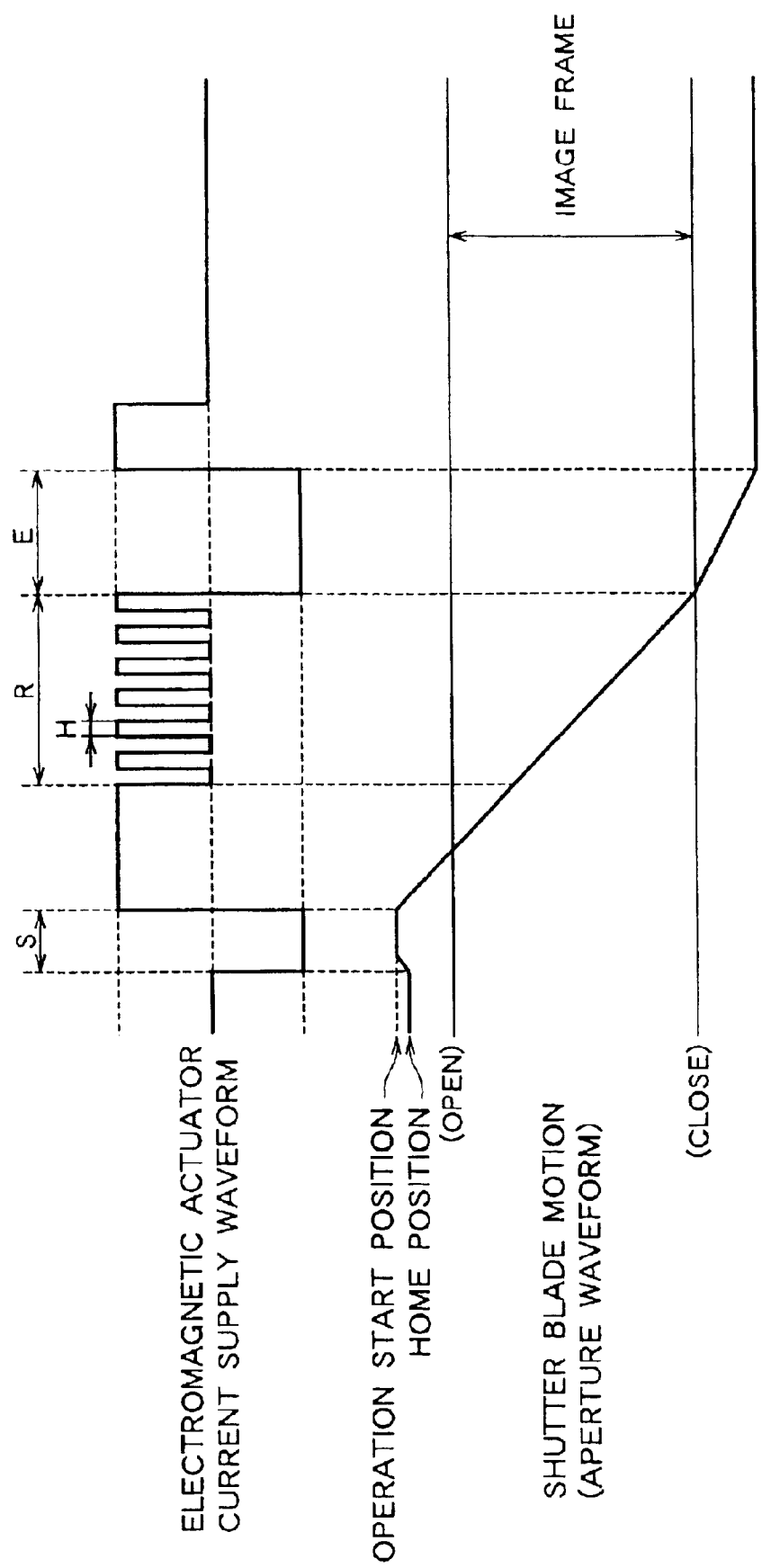
FIG. 18 is a time chart that explains another current supply control and another exposure operation in the camera shutter device shown in FIG. 14.

FIG. 18 is a time chart when other current supply control is made in the case that the camera shutter device is mounted in a digital still camera.

As shown in FIG. 18, in this current supply control, particularly by supplying current with pulse in the predetermined width H in the area R where the shutter blade 310 is on the move after starting moving to close, low electric power supply is obtained.

Also, in this current supply control, power consumption can be reduced while the shutter blade 310 moves securely by its inertia force in the same manner as above.

Figure 19:
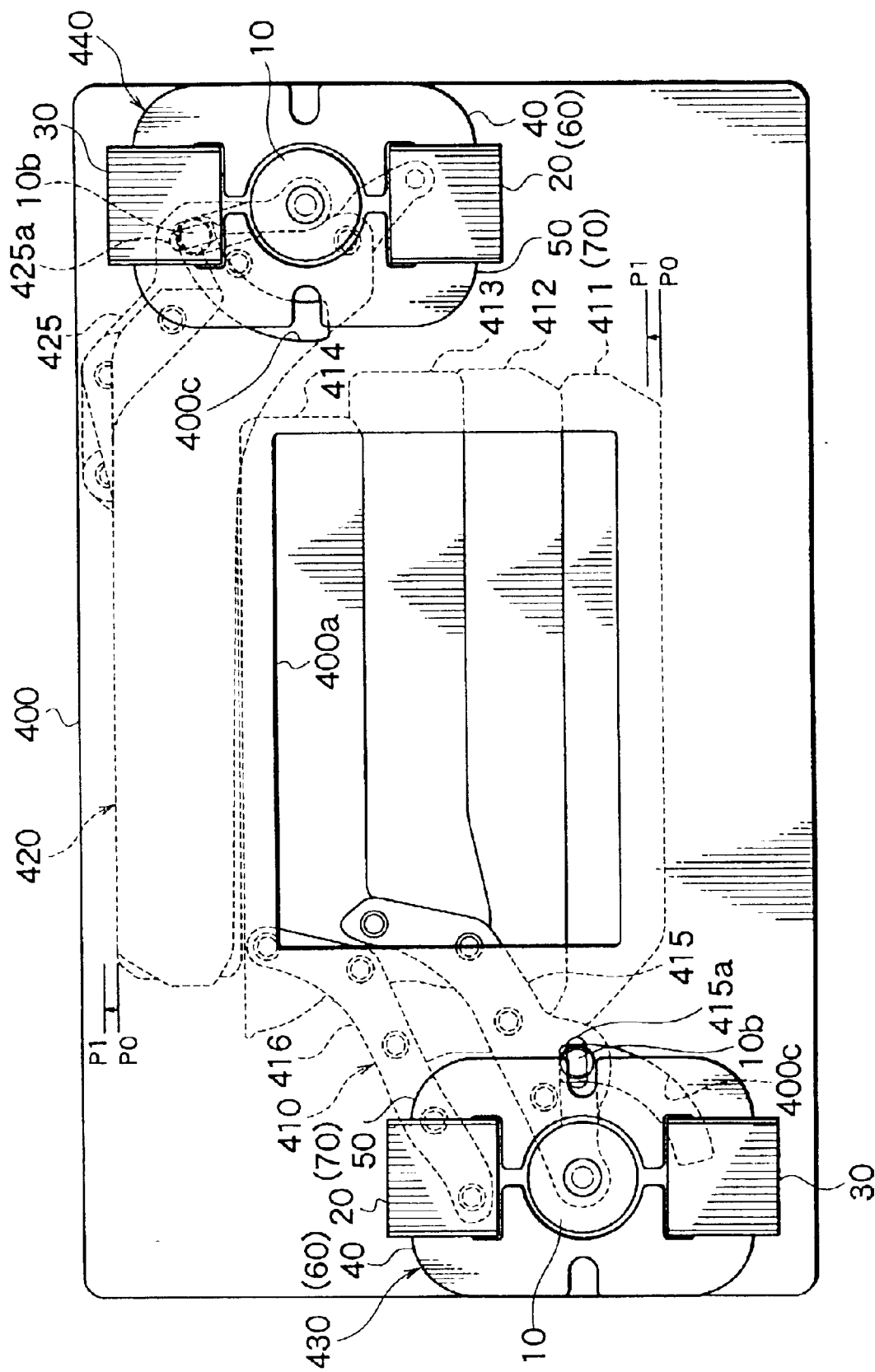
FIG. 19 is a plan view that shows still another embodiment of a camera shutter device in accordance with the present invention and illustrates the conditions of the aperture closed and opened, respectively, by the before-moving and after-moving blades.
Figure 20:
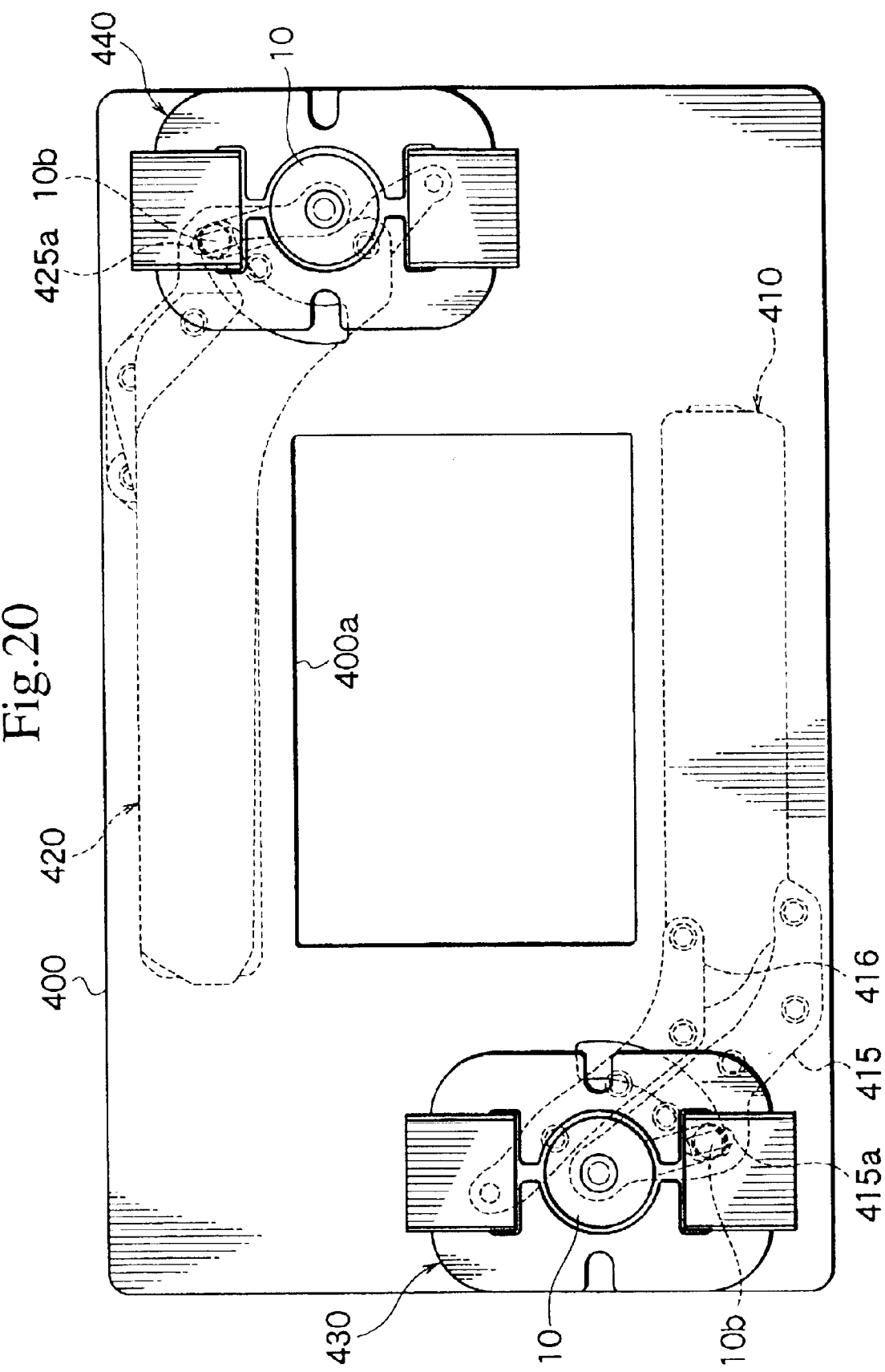
FIG. 20 is a plan view that shows the condition of the aperture opened by the before-moving and after-moving blades in the camera shutter device shown in FIG. 19.
Figure 21:
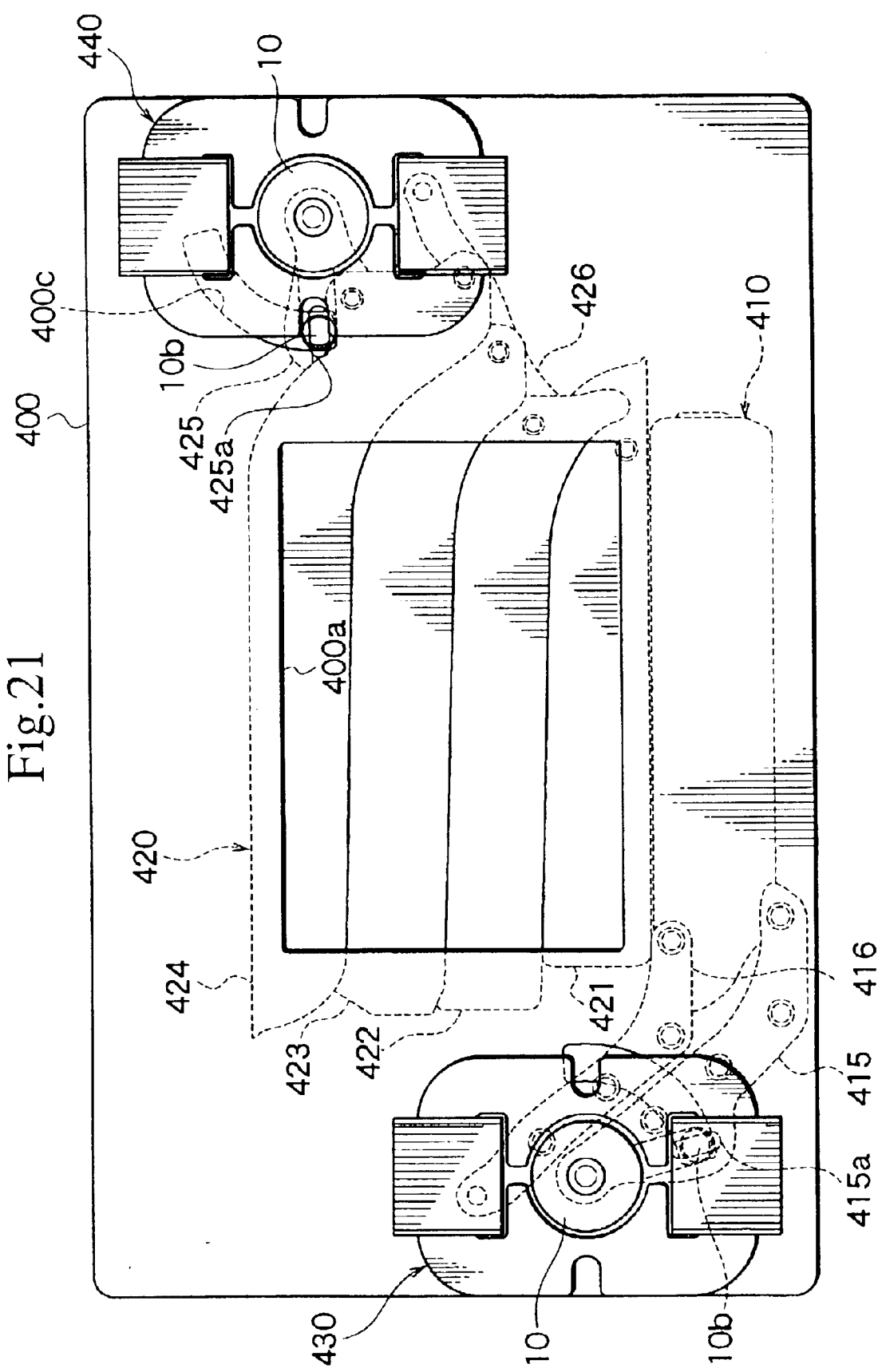
FIG. 21 is a plan view that shows the conditions of the aperture opened and closed, respectively, by the front and after-moving blades in the camera shutter device shown in FIG. 19.

FIGS. 19 to 21 show another embodiment of a camera shutter device in accordance with the present invention.

As shown in FIGS. 19 to 21, the camera shutter device related to this embodiment includes a base plate 400 having an aperture 400a for exposure, a before-moving blade 410 and an after-moving blade 420 opening and closing the aperture 400a as a shutter blade, a before-moving blade electromagnetic actuator 430 arranged on the lower left side of the aperture 400a to directly drive the before-moving blade 410, an after-moving blade electromagnetic actuator 440 arranged on the upper right side of the aperture 400a to directly drive the after-moving blade 420, and a control circuit (not shown in the drawing) including a CPU to control current supply to the before-moving blade electromagnetic actuator 430 and the after-moving blade electromagnetic actuator 440 as a control means. Besides, the before-moving blade electromagnetic actuator 430 and the after-moving blade electromagnetic actuator 440 have the same configuration as that of the electromagnetic actuator in FIGS. 1 to 4 or FIGS. 5 to 7.

As shown in FIG. 19, the before-moving blade 410 is composed of blades 411, 412, 413 and 414 (4 pieces according to this configuration), a drive arm 415 and a support arm 416 that connect the blades 411, 412, 413 and 414 to rotate these blades freely. The drive arm 415 and the support arm 416 are supported to rotate freely by support shafts (not shown in the drawing) formed on the rear face of the base plate 400.

The drive pin 10b of the before-moving blade electromagnetic actuator 430 is connected to a long hole 415a in the drive arm 415. When the rotor 10 rotates within the range of substantially 90 degrees, the drive arm 415 and the support arm 416 move back and forth and the blades 411, 412, 413 and 414 make substantially linear reciprocating motion between the closed position in which the blades spread out and close the aperture 400a as shown in FIG. 19 and the opened position in which the blades overlap at the under side and open the aperture 400a as shown in FIGS. 20 and 21.

As shown in FIG. 21, the after-moving blade 420 is composed of blades 421, 422, 423 and 424 (4 pieces according to this configuration), a drive arm 425 and a support arm 426 that connect the blades 421, 422, 423 and 424 to rotate these blades freely. The drive arm 425 and the support arm 426 are supported to rotate freely by support shafts (not shown in the drawing) formed on the rear face of the base plate 400.

The drive pin 10b of the after-moving blade electromagnetic actuator 440 is connected to a long hole 425a in the drive arm 425. When the rotor 10 rotates within the range of substantially 90 degrees, the drive arm 425 and the support arm 426 move back and forth and the blades 421, 422, 423 and 424 make substantially linear reciprocating motion between the opened position in which the blades overlap at the upper side and open the aperture 400a as shown in FIGS. 19 and 20 and the closed position in which the blades spread out and close the aperture 400a as shown in FIG. 21.

Figure 22:
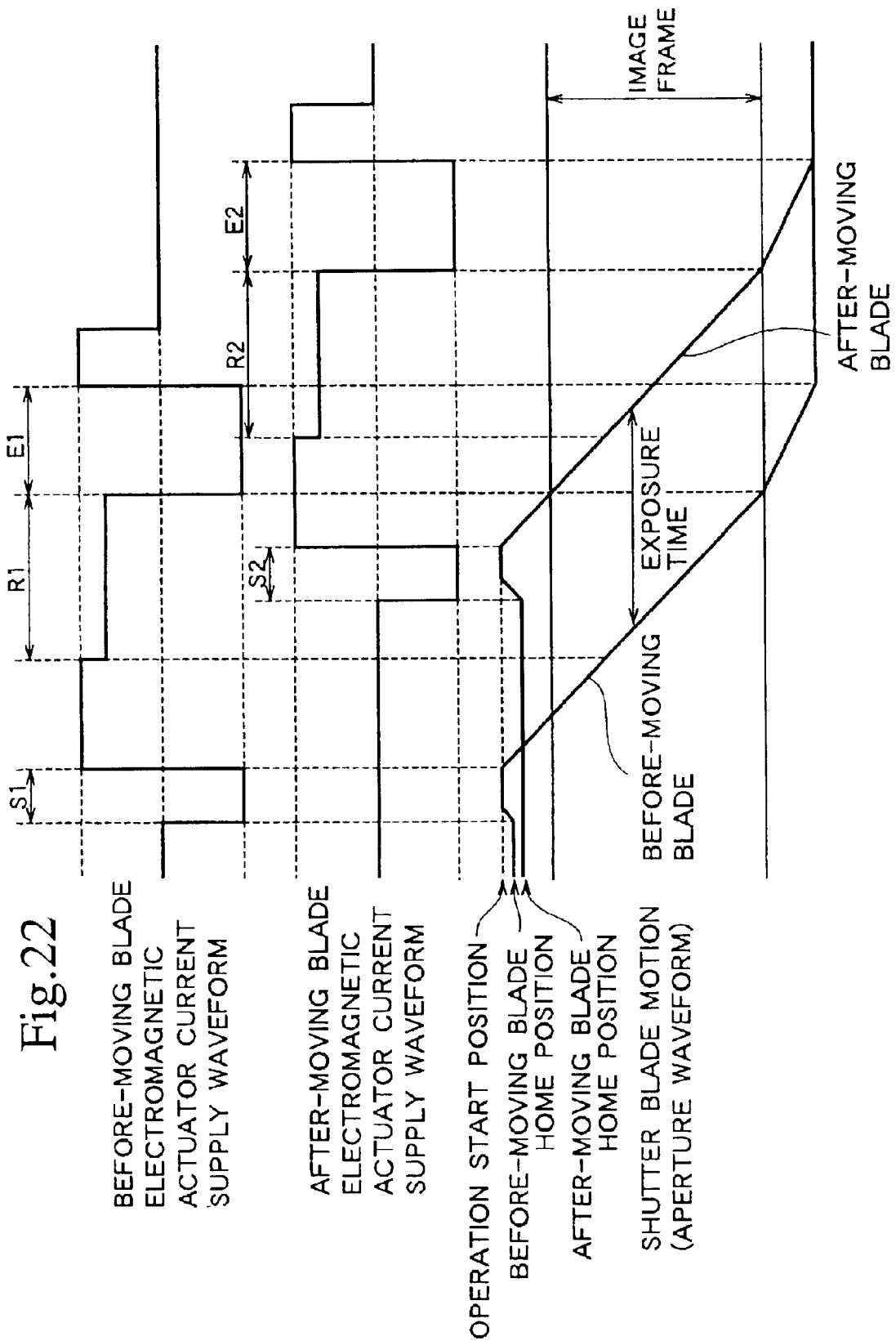
FIG. 22 is a time chart that explains a current supply control and an exposure operation in the camera shutter device shown in FIG. 19.

The operation of the camera shutter device when it is mounted in a silver-film type camera is described hereunder by referring to the time chart shown in FIG. 22.

In the standby condition for photography with the main switch of the camera turned on, the before-moving blade 410 is at the closed position and the after-moving blade 420 is at the opened position as shown in FIG. 19. Then, the respective drive pins 10b of the before-moving blade electromagnetic actuator 430 and the after-moving blade electromagnetic actuator 440 are located near the upper end portion of the guide hole 400c and keep the before-moving blade 410 at the closed position and the after-moving blade 420 at the opened position, respectively, by the magnetic holding force in the condition of no current supply.

When a user conducts a release operation in this standby condition, the control circuit supplies the before-moving blade electromagnetic actuator 430 with current for the direction opposite to the direction in which the before-moving blade 410 moves to open as shown in area S1 in FIG. 22. By this method, the before-moving blade 410 is positioned from the home position P0 whereat the magnetic holding force balances the external force, to the operation start position P1 where is set primarily for exposure operation, that is, the position where the drive pin 10b contacts the upper end portion of the guide hole 400c.

On the other hand, after the predetermined time (exposure time) has elapsed, the control circuit also supplies the after-moving blade electromagnetic actuator 440 with current for the direction opposite to the direction in which the after-moving blade 420 moves to close as shown in area S2 in FIG. 22. By this method, the after-moving blade 420 is positioned from the home position P0 whereat the magnetic holding force balances the external force, to the operation start position P1 where is set primarily for exposure operation, that is, the position where the drive pin 10b contacts the upper end portion of the guide hole 400c.

As shown above, only by controlling current supply for reverse direction before the start of exposure operation, the before-moving blade 410 and the after-moving blade 420 are positioned in advance at the predetermined operation start position P1 and the exposure operation is started by a stable specified timing, and as a whole, a stable exposure operation can be performed.

Next, for the purpose of exposure operation, the control circuit supplies the before-moving blade electromagnetic actuator 430 with the predetermined current for the direction in which the before-moving blade 410 moves to open. Then, the rotor 10 turns clockwise and the before-moving blade 410 starts moving toward the opened position at an increased speed.

As shown in the area R1 in FIG. 22, the control circuit supplies the before-moving blade electromagnetic actuator 430 with a low current so that the current value in the area where the before-moving blade is on the move after starting moving to open becomes smaller than the current value in the area where the before-moving blade starts moving.

On the other hand, after the predetermined time (exposure time) has elapsed, for the purpose of exposure operation, the control circuit also supplies the after-moving blade electromagnetic actuator 440 with the predetermined current for the direction in which the after-moving blade 420 moves to close. Then, the rotor 10 turns counterclockwise and the after-moving blade 420 starts moving toward the closed position at an increased speed.

As shown in the area R2 in FIG. 22, the control circuit supplies the after-moving blade electromagnetic actuator 440 with a low current so that the current value in the area where the after-moving blade is on the move after starting moving to close becomes smaller than the current value in the area where the after-moving blade starts moving.

In this way, by lowering the current when the before-moving blade 410 and the after-moving blade 420 are moving due to the inertia force, power consumption required for exposure operation can be reduced while the blades make a stable movement.

Next, when the before-moving blade 410 moves to open and approaches the opened position, the control circuit supplies the before-moving blade electromagnetic actuator 430 with current for the direction opposite to the direction in which the before-moving blade 410 moves to open, immediately before the blade completes its movement, as shown in area E1 in FIG. 22.

As shown in FIG. 20, simultaneously when or immediately before the before-moving blade 410 completely opens the aperture 400a and contacts the stopper (the stopper function is obtained when the drive pin 10b contacts the lower end portion of the guide hole 400c), the control circuit supplies the before-moving blade electromagnetic actuator 430 again with current for the direction in which the before-moving blade 410 moves to open, and cuts off current when the before-moving blade 410 securely contacts the stopper and stops.

On the other hand, when the after-moving blade 420 moves to close and approaches the closed position, the control circuit supplies the after-moving blade electromagnetic actuator 440 with current for the direction opposite to the direction in which the after-moving blade 420 moves to close, immediately before the blade completes its movement, as shown in area E2 in FIG. 22. As shown in FIG. 21, simultaneously when or immediately before the after-moving blade 420 completely closes the aperture 400a and contacts the stopper (the stopper function is obtained when the drive pin 10b contacts the lower end portion of the guide hole 400c), the control circuit supplies the after-moving blade electromagnetic actuator 440 again with current for the direction in which the after-moving blade 420 moves to close, and cuts off current when the after-moving blade 420 securely contacts the stopper and stops.

In this way, by controlling current supply in the reverse direction immediately before the before-moving blade 410 and the after-moving blade 420 complete the movement, the movement of the blades 410, 420 is braked and the blades 410, 420 stop promptly at the predetermined opened and closed positions, respectively, without generating a bound phenomenon, etc. Therefore, when successive photography is carried out, the sequence time required for a single-time photography can be shortened and a high shutter speed can be realized.

After the before-moving blade 410 and the after-moving blade 420 stop at the opened and closed positions, respectively, the respective drive pins 10b of the before-moving blade electromagnetic actuator 430 and the after-moving blade electromagnetic actuator 440 contact the lower end portion of the guide hole 400c and are restricted to keep the before-moving blade 410 and the after-moving blade 420 at the opened and closed positions, respectively, by the magnetic holding force in the condition of no current supply.

The exposure operation is performed by the movement of the before-moving blade 410 and the after-moving blade 420, and a single-time photography is completed.

After that, the control circuit supplies the before-moving blade electromagnetic actuator 430 and the after-moving blade electromagnetic actuator 440 with current for the reverse direction, the before-moving blade 410 moves to close and reaches again the closed position and the after-moving blade 440 moves to open and reaches again the opened position as shown in FIG. 19. Then, current supply for the before-moving blade electromagnetic actuator 430 and the after-moving blade electromagnetic actuator 440 is cut off and the standby condition for photography is ready. The sequence is repeated in the following photography.

In the exposure operation, current supply control for reverse direction in areas S1 and S2, low current supply control in areas R1 and R2, and current supply control for reverse direction in areas E1 and E2 are all adopted. However, only one of the current supply controls can be adopted. Even in this case, the working effect corresponding to the respective current supply control can be obtained.

Figure 23:
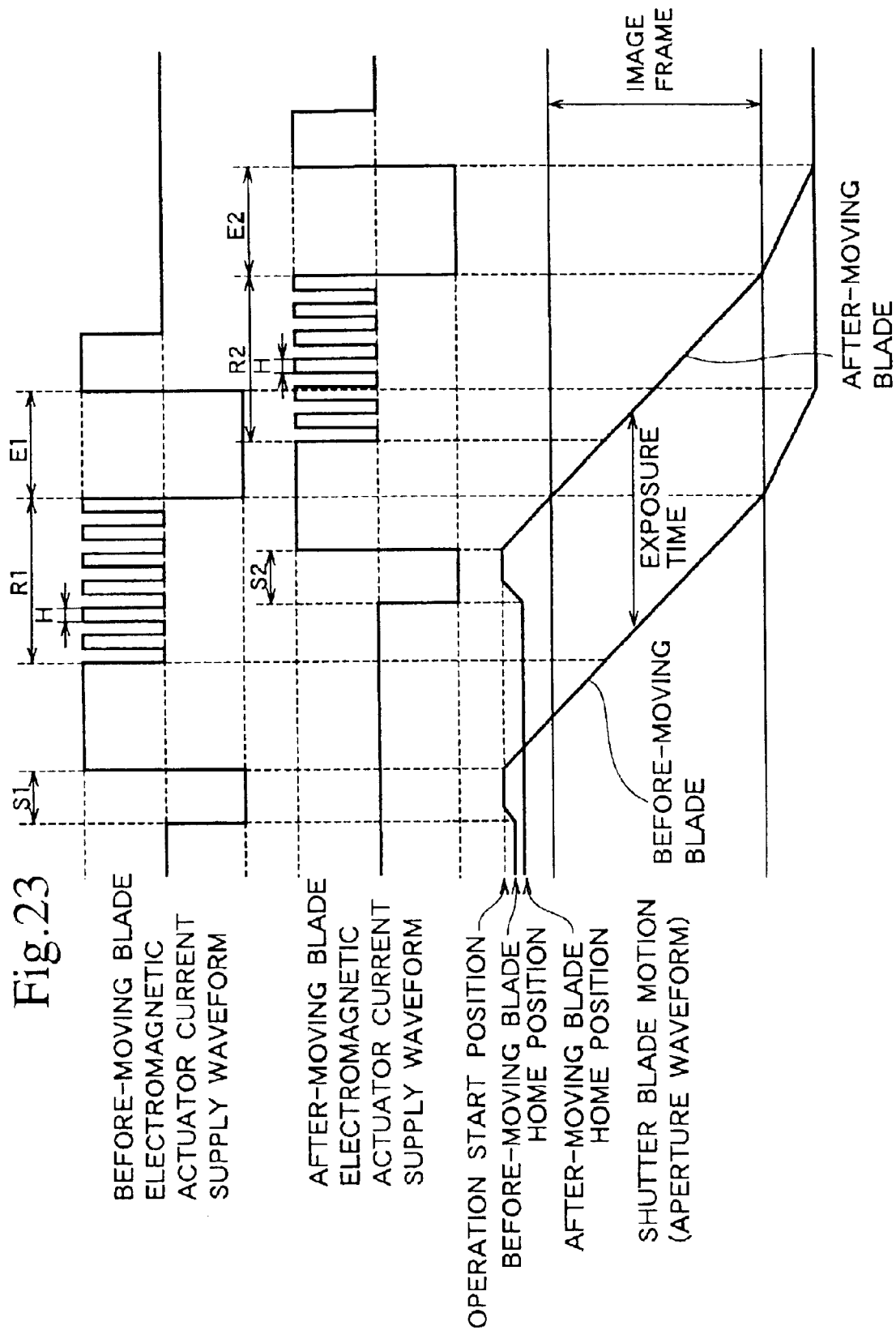
FIG. 23 is a time chart that explains another current supply control and another exposure operation in the camera shutter device shown in FIG. 19.

FIG. 23 is a time chart when other current supply control is made in case the camera shutter device shown in FIGS. 19 to 21 is mounted in a silver-film type camera.

As shown in FIG. 23, in this current supply control, particularly by supplying current with pulse in the predetermined width H in the area R1 where the before-moving blade 410 is on the move after starting moving to open and in the area R2 where the after-moving blade 420 is on the move after starting moving to close, low electric power supply is obtained.

Also, in this current supply control, power consumption can be reduced while the before-moving blade 410 and the after-moving blade 420 move securely by the inertia force in the same manner as above.

In this embodiment, the before-moving blade electromagnetic actuator 430 is supplied with current for the reverse direction immediately before the before-moving blade 410 and the after-moving blade 420 start moving, and after the predetermined time has elapsed, the after-moving blade electromagnetic actuator 440 is supplied with current for the reverse direction. For the purpose of simplifying the control, however, the after-moving blade electromagnetic actuator 440 can be supplied with current for the reverse direction at the same time when the before-moving blade electromagnetic actuator 430 is supplied with current for the reverse direction.

As shown above, in the camera shutter device, by controlling current supply in the reverse direction immediately before the shutter blade completes the movement, the shutter blade can be positioned securely at the predetermined operation start position and a stable exposure operation can be obtained. Also, by supplying lower current in the area where the blade is on the move than in the area where the blade starts moving, power consumption required for driving the shutter blade can be reduced while the shutter blade makes a stable movement using the inertia force. Moreover, by controlling current supply in the reverse direction immediately before the shutter blade completes the movement, the shutter blade moving due to the inertia force is braked, and a bound phenomenon and the like can be prevented when the blade stops after hitting the stopper or the like.

More specifically, by controlling current supply for an electromagnetic drive source as required, without using a mechanical holding mechanism for the starting operation or a mechanical brake mechanism or the like required at the completion of the operation, power consumption is reduced and a stable exposure operation can be obtained as a whole. By this method, simplification of the configuration can be achieved while a high shutter speed can be realized.

Figure 24:
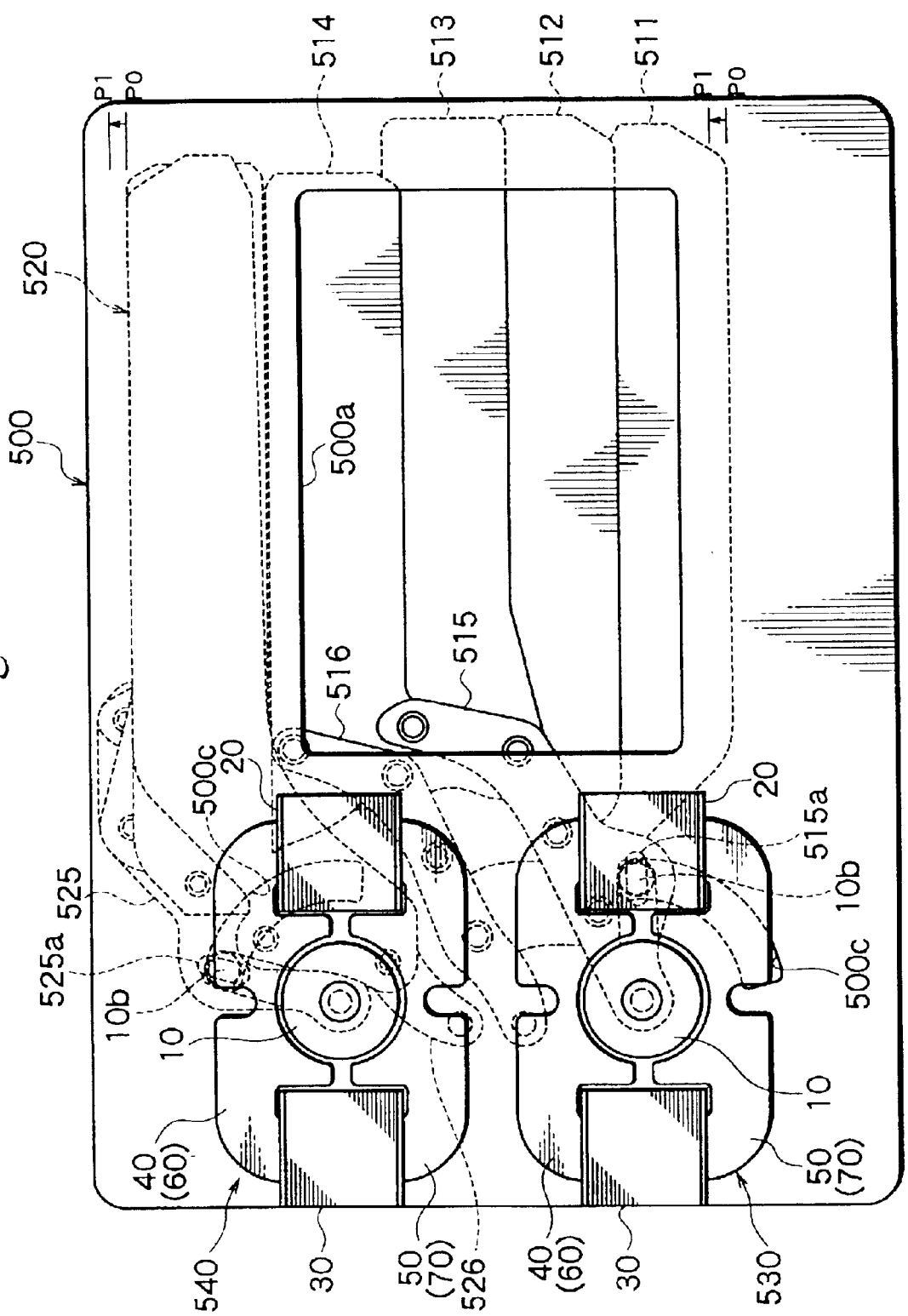
FIG. 24 is a plan view that shows still another embodiment of a camera shutter device in accordance with the present invention and illustrates the conditions of the aperture closed and opened by the first and second shutter blades, respectively.
Figure 25:
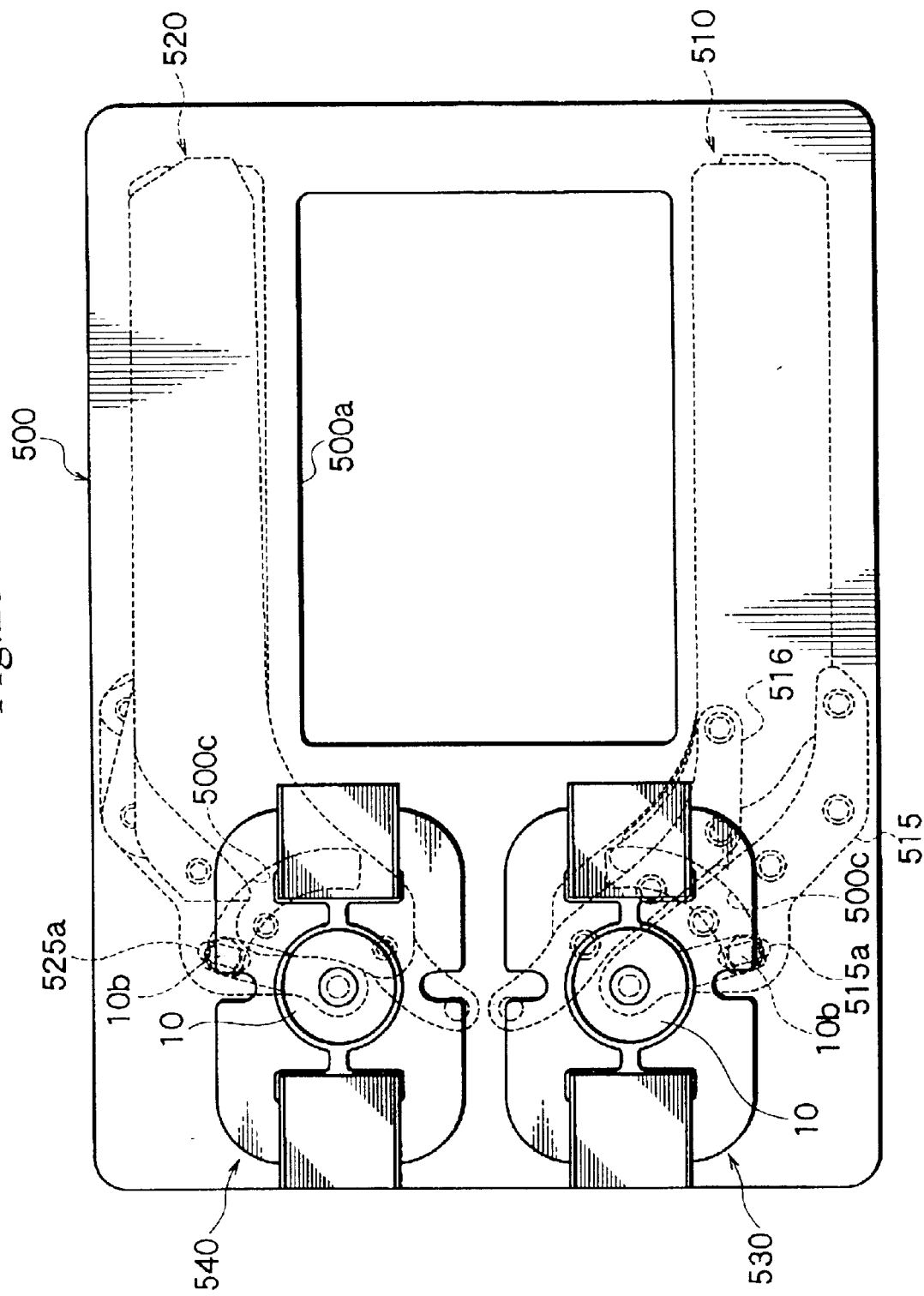
FIG. 25 is a plan view that shows the condition of the aperture opened by the first and second shutter blades in the camera shutter device shown in FIG. 24.
Figure 26:
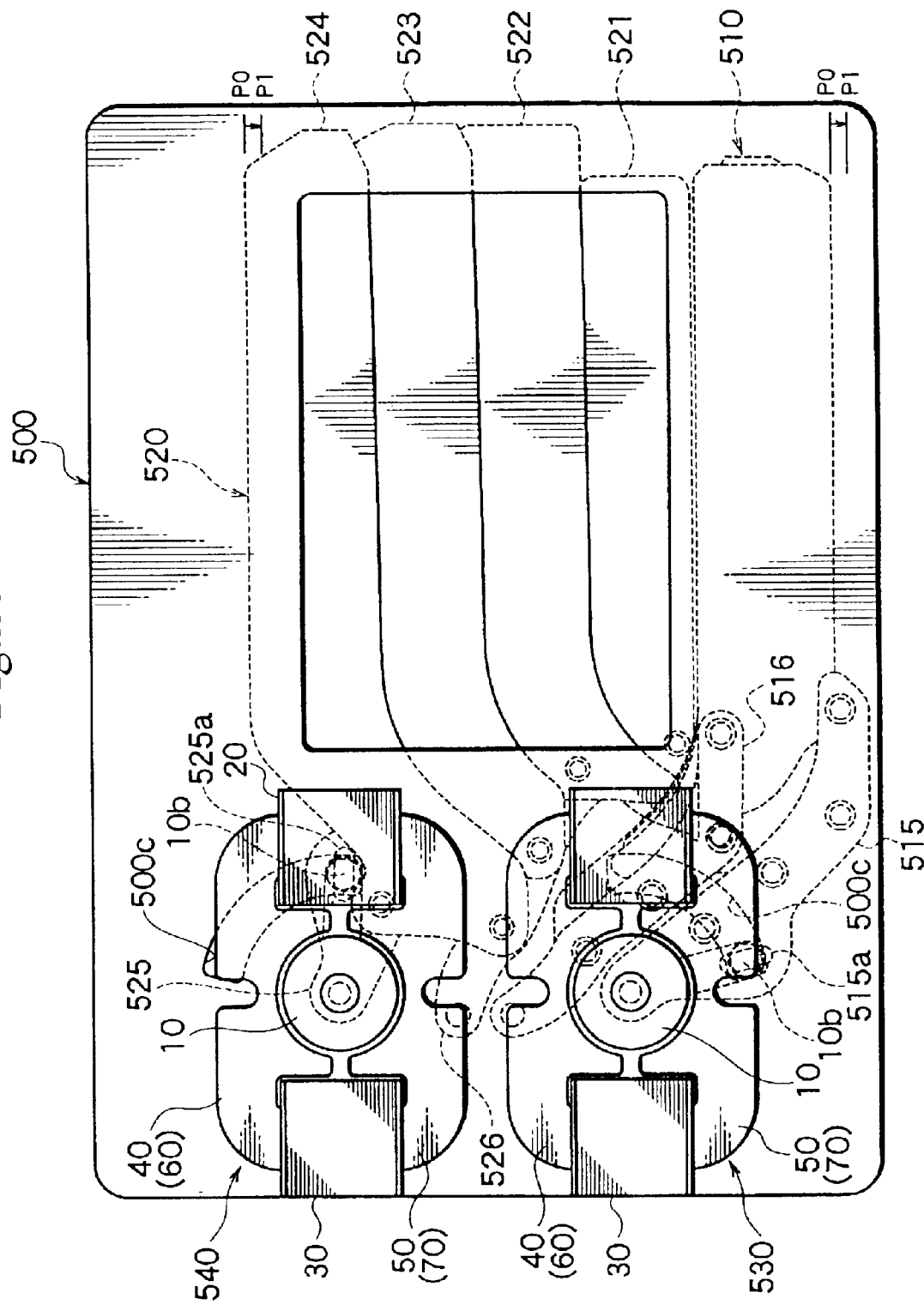
FIG. 26 is a plan view that shows the conditions of the aperture opened and closed, respectively, by the first and second shutter blades in the camera shutter device shown in FIG. 24.

FIGS. 24 to 26 show another embodiment of a camera shutter device in accordance with the present invention.

As shown in FIGS. 24 to 26, the camera shutter device related to this embodiment includes a base plate 500 having an aperture 500a for exposure, a first shutter blade 510 and a second shutter blade 520 opening and closing the aperture 500a, a first electromagnetic actuator 530 arranged on the lower left side (one side) of the aperture 500a to directly drive the first shutter blade 510, a second electromagnetic actuator 540 arranged side by side with the first electromagnetic actuator 530 on the upper right side (one side) of the aperture 500a to directly drive the second shutter blade 520, and a control circuit (not shown in the drawing) including a CPU to control current supply to the first electromagnetic actuator 530 and the second electromagnetic actuator 540 as a control means. Besides, the first electromagnetic actuator 530 and the second electromagnetic actuator 540 have the same configuration as that of the electromagnetic actuator in FIGS. 1 to 4 or FIGS. 5 to 7. According to this configuration, especially, the first electromagnetic actuator 530 and the second electromagnetic actuator 540 are arranged on one side of the aperture 500a, and their extending directions become parallel to each other in the horizontal direction. By arranging them on one side, parts-intensive configuration can be made, and particularly, the width of the device can be narrowed vertically. Therefore, if this device is mounted in a camera, the width of the camera can be reduced horizontally and vertically and the camera can be miniaturized.

As shown in FIG. 24, the first shutter blade 510 is composed of blades 511, 512, 513 and 514 (4 pieces according to this configuration), a drive arm 515 and a support arm 516 that connect the blades 511, 512, 513 and 514 to rotate these blades freely. The drive arm 515 and the support arm 516 are supported to rotate freely by support shafts (not shown in the drawing) formed on the rear face of the base plate 500.

The drive pin 10b of the first electromagnetic actuator 530 is connected to a long hole 515a in the drive arm 515. When the rotor 10 rotates within the range of substantially 90 degrees, the drive arm 515 and the support arm 516 move back and forth, and the blades 511, 512, 513 and 514 make substantially linear reciprocating motion between the closed position in which the blades spread out and close the aperture 500a as shown in FIG. 24 and the opened position in which the blades overlap at the under side and open the aperture 500a as shown in FIGS. 25 and 26.

As shown in FIG. 26, the second shutter blade 520 is composed of blades 521, 522, 523 and 524 (4 pieces according to this configuration), a drive arm 525 and a support arm 526 that connect the blades 521, 522, 523 and 524 to rotate these blades freely. The drive arm 525 and the support arm 526 are supported to rotate freely by support shafts (not shown in the drawing) formed on the rear face of the base plate 500.

The drive pin 10b of the second electromagnetic actuator 540 is connected to a long hole 525a in the drive arm 525. When the rotor 10 rotates within the range of substantially 90 degrees, the drive arm 525 and the support arm 526 move back and forth, and the blades 521, 522, 523 and 524 make substantially linear reciprocating motion between the opened position in which the blades overlap at the upper side and open the aperture 500a as shown in FIGS. 24 and 25 and the closed position in which the blades spread out and close the aperture 500a as shown in FIG. 26.

Figure 27:
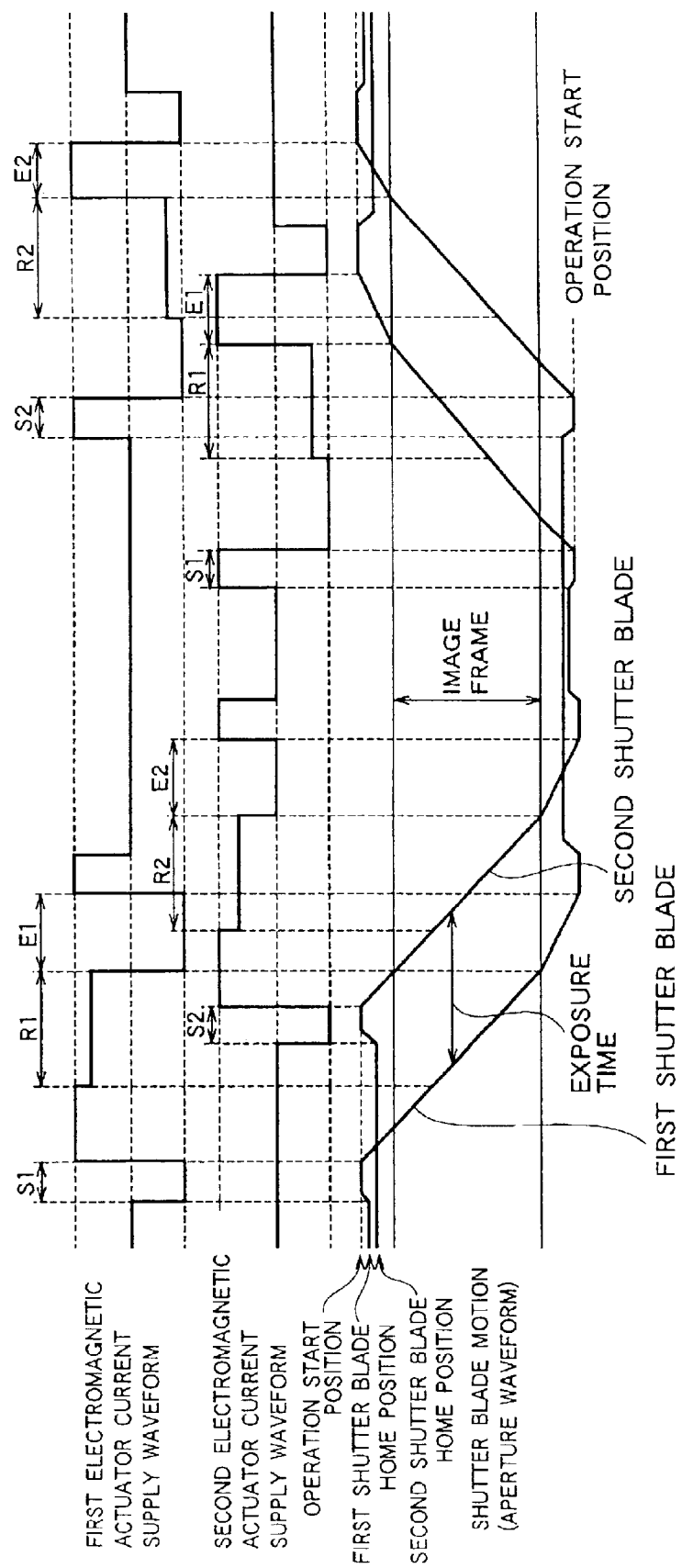
FIG. 27 is a time chart that explains a current supply control and an exposure operation in the camera shutter device shown in FIG. 24.

The operation of the camera shutter device when it is mounted in a silver-film type camera is described hereunder by referring to the time chart shown in FIG. 27.

In the standby condition for photography with the main switch of the camera turned on, the first shutter blade 510 is at the closed position and the second shutter blade 520 is at the opened position as shown in FIG. 24. Then, the respective drive pins 10b of the first electromagnetic actuator 530 and the second electromagnetic actuator 540 are located near the upper end portion of the guide hole 500c and keep the first shutter blade 510 at the closed position and keep the second shutter blade 520 at the opened position, respectively, by balancing the magnetic holding force and the external force in the condition of no current supply.

When a user conducts a release operation in this standby condition, the control circuit supplies the first electromagnetic actuator 530 with current for the direction opposite to the direction in which the first shutter blade 510 moves to open as shown in area S1 in FIG. 27. By this method, the first shutter blade 510 is positioned from the stop position P0 whereat the magnetic holding force balances the external force, to the operation start position P1 where is set primarily for exposure operation, that is, the position where the drive pin 10b contacts the upper end portion of the guide hole 500c.

On the other hand, after the predetermined time (exposure time) has elapsed, the control circuit also supplies the second electromagnetic actuator 540 with current for the direction opposite to the direction in which the second shutter blade 520 moves to close as shown in area S2 in FIG. 27. By this method, the second shutter blade 520 is positioned from the stop position P0 whereat the magnetic holding force balances the external force, to the operation start position P1 where is set primarily for exposure operation, that is, the position where the drive pin 10b contacts the upper end portion of the guide hole 500c.

As shown above, only by controlling current supply for reverse direction before the start of exposure operation, the first shutter blade 510 and the second shutter blade 520 are positioned in advance at the predetermined operation start position P1 and the exposure operation is started by a stable specified timing, and as a whole, a stable exposure operation can be performed.

Next, for the purpose of exposure operation, the control circuit supplies the first electromagnetic actuator 530 with the predetermined current for the direction in which the first shutter blade 510 moves to open. As a result, the rotor 10 turns clockwise and the first shutter blade 510 starts moving toward the opened position at an increased speed.

As shown in the area R1 in FIG. 27, the control circuit supplies the first electromagnetic actuator 530 with a low current so that the current value in the area where the first shutter blade 510 is on the move after starting moving to open becomes smaller than the current value in the area where the first shutter blade 510 starts moving.

In this way, by lowering the current when the first shutter blade 510 is moving due to the inertia force, power consumption required for exposure operation can be reduced while the first shutter blade 510 makes a stable movement.

On the other hand, after the predetermined time (exposure time) has elapsed, for the purpose of exposure operation, the control circuit also supplies the second electromagnetic actuator 540 with the predetermined current for the direction in which the second shutter blade 520 moves to close. As a result, the rotor 10 turns counterclockwise and the second shutter blade 520 starts moving toward the closed position at an increased speed.

As shown in the area R2 in FIG. 27, the control circuit supplies the second electromagnetic actuator 540 with a low current so that the current value in the area where the second shutter blade 520 is on the move after starting moving to close becomes smaller than the current value in the area where the second shutter blade 520 starts moving.

In this way, by lowering the current when the second shutter blade 520 is moving due to the inertia force, power consumption required for exposure operation can be reduced while the second shutter blade 520 makes a stable movement.

Then, when the first shutter blade 510 moves to open and approaches the opened position, the control circuit supplies the first electromagnetic actuator 530 with current for the direction opposite to the direction in which the first shutter blade 510 moves to open, immediately before the blade completes its movement, as shown in area E1 in FIG. 27.

As shown in FIG. 25, simultaneously when or immediately before the first shutter blade 510 completely opens the aperture 500a and contacts the stopper (the stopper function is obtained when the drive pin 10b contacts the lower end portion of the guide hole 500c), the control circuit supplies the first electromagnetic actuator 530 again with current for the direction in which the first shutter blade 510 moves to open, and cuts off current when the first shutter blade 510 securely contacts the stopper and stops.

On the other hand, when the second shutter blade 520 moves to close and approaches the closed position, the control circuit supplies the second electromagnetic actuator 540 with current for the direction opposite to the direction in which the second shutter blade 520 moves to close, immediately before the blade completes its movement, as shown in area E2 in FIG. 27. As shown in FIG. 26, simultaneously when or immediately before the second shutter blade 520 completely closes the aperture 500a and contacts the stopper (the stopper function is obtained when the drive pin 10b contacts the lower end portion of the guide hole 500c), the control circuit supplies the second electromagnetic actuator 540 again with current for the direction in which the second shutter blade 520 moves to close, and cuts off current when the second shutter blade 520 securely contacts the stopper and stops.

In this way, by controlling current supply in the reverse direction immediately before the first shutter blade 510 and the second shutter blade 520 complete the movement, the movement of the blades 510, 520 is braked and the first shutter blade 510 and the second shutter blade 520 stop promptly at the predetermined opened and closed positions, respectively, without generating a bound phenomenon, etc. Therefore, when successive photography is made, the sequence time required for a single-time photography can be shortened and a high shutter speed can be realized.

As shown above, the exposure operation is performed by the movement of the first shutter blade 510 as a before-moving blade and the second shutter blade 520 as an after-moving blade, and a single-time photography is completed.

After the first shutter blade 510 and the second shutter blade 520 stop at the opened and closed positions, respectively, the respective drive pins 10b of the first electromagnetic actuator 530 and the second electromagnetic actuator 540 are positioned near the lower end portion of the guide hole 500c and keep the first shutter blade 510 at the opened position and keep the second shutter blade 520 at the closed position, respectively, by the magnetic holding force in the condition of no current supply. With the blades at these positions, the camera is set in the standby condition for photography.

When a user conducts a release operation again in this standby condition, the control circuit supplies the second electromagnetic actuator 540 with current for the direction opposite to the direction in which the second shutter blade 520 moves to open as shown in area S1 in FIG. 27. By this method, the second shutter blade 520 is positioned from the home position P0 to the operation start position P1, that is, the position where the drive pin 10b contacts the lower end portion of the guide hole 500c.

On the other hand, after the predetermined time (exposure time) has elapsed, the control circuit also supplies the first electromagnetic actuator 530 with current for the direction opposite to the direction in which the first shutter blade 510 moves to close as shown in area S2 in FIG. 27. By this method, the first shutter blade 510 is positioned from the home position P0 to the operation start position P1, that is, the position where the drive pin 10*b* contacts the lower end portion of the guide hole 500*c*.

As shown above, only by controlling current supply for reverse direction before the start of exposure operation, the second shutter blade 520 and the first shutter blade 510 are positioned in advance at the predetermined operation start position P1 and the exposure operation is started by a stable specified timing, and as a whole, a stable exposure operation can be performed.

Then, for the purpose of exposure operation, the control circuit supplies the second electromagnetic actuator 540 with the predetermined current for the direction in which the second shutter blade 520 moves to open. By this method, the rotor 10 turns counterclockwise and the second shutter blade 520 starts moving toward the opened position at an increased speed.

As shown in the area R1 in FIG. 27, the control circuit supplies the second electromagnetic actuator 540 with a low current so that the current value in the area where the second shutter blade 520 is on the move after starting moving to open becomes smaller than the current value in the area where the second shutter blade 520 starts moving.

On the other hand, for the purpose of exposure operation, after the predetermined time (exposure time) has elapsed, the control circuit also supplies the first electromagnetic actuator 530 with current for the direction in which the first shutter blade 510 moves to close, the rotor 10 turns counterclockwise and the first shutter blade 510 starts moving toward the closed position at an increased speed.

As shown in the area R2 in FIG. 27, the control circuit supplies the first electromagnetic actuator 530 with a low current so that the current value in the area where the first shutter blade 510 is on the move after starting moving to close becomes smaller than the current value in the area where the first shutter blade 510 starts moving.

In this way, by lowering the current when the second shutter blade 520 and the first shutter blade 510 are moving due to the inertia force, power consumption required for exposure operation can be reduced while the blades make a stable movement.

Then, when the second shutter blade 520 moves to open and approaches the opened position, the control circuit supplies the second electromagnetic actuator 540 with current for the direction opposite to the direction in which the second shutter blade 520 moves to open, immediately before the blade completes its movement, as shown in area E1 in FIG. 27.

As shown in FIG. 25, simultaneously when or immediately before the second shutter blade 520 completely opens the aperture 500*a* and contacts the stopper (the stopper function is obtained when the drive pin 10*b* contacts the upper end portion of the guide hole 500*c*), the control circuit supplies the second electromagnetic actuator 540 again with current for the direction in which the second shutter blade 520 moves to open, and cuts off current when the second shutter blade 520 securely contacts the stopper and stops.

On the other hand, when the first shutter blade 510 moves to close and approaches the closed position, the control circuit supplies the first electromagnetic actuator 530 with current for the direction opposite to the direction in which the first shutter blade 510 moves to close, immediately before the blade completes its movement, as shown in area E2 in FIG. 27. As shown in FIG. 24, simultaneously when or immediately before the first shutter blade 510 completely closes the aperture 500*a* and contacts the stopper (the stopper function is obtained when the drive pin 10*b* contacts the upper end portion of the guide hole 500*c*), the control circuit supplies the first electromagnetic actuator 530 again with current for the direction in which the first shutter blade 510 moves to close, and cuts off current when the first shutter blade 510 securely contacts the stopper and stops.

In this way, by controlling current supply in the reverse direction immediately before the second shutter blade 520 and the first shutter blade 510 complete the movement, the movement of the blades 510, 520 is braked and the second shutter blade 520 and the first shutter blade 510 stop promptly at the predetermined opened and closed positions, respectively, without generating a bound phenomenon, etc. Therefore, when successive photography is made, the sequence time required for a single-time photography can be shortened and the frequency of successive photography can be increased.

As shown above, the exposure operation is performed by the movement of the second shutter blade 520 as a before-moving blade and the first shutter blade 510 as an after-moving blade, and a single-time photography is completed.

After the second shutter blade 520 and the first shutter blade 510 stop at the opened and closed positions, respectively, the respective drive pins 10*b* of the second electromagnetic actuator 540 and the first electromagnetic actuator 530 are positioned near the upper end portion of the guide hole 500*c* and keep the second shutter blade 520 at the opened position and the first shutter blade 510 at the closed position, respectively, by the magnetic holding force in the condition of no current supply. With the blades at these positions, the camera is set in the standby condition for photography. The sequence is repeated in the following photography.

In the exposure operation, current supply control for reverse direction in areas S1 and S2, low current supply control in areas R1 and R2, and current supply control for reverse direction in areas E1 and E2 are all adopted. However, only one of the current supply controls can be adopted. Even in this case, the working effect corresponding to the respective current supply control can be obtained.

Figure 28:
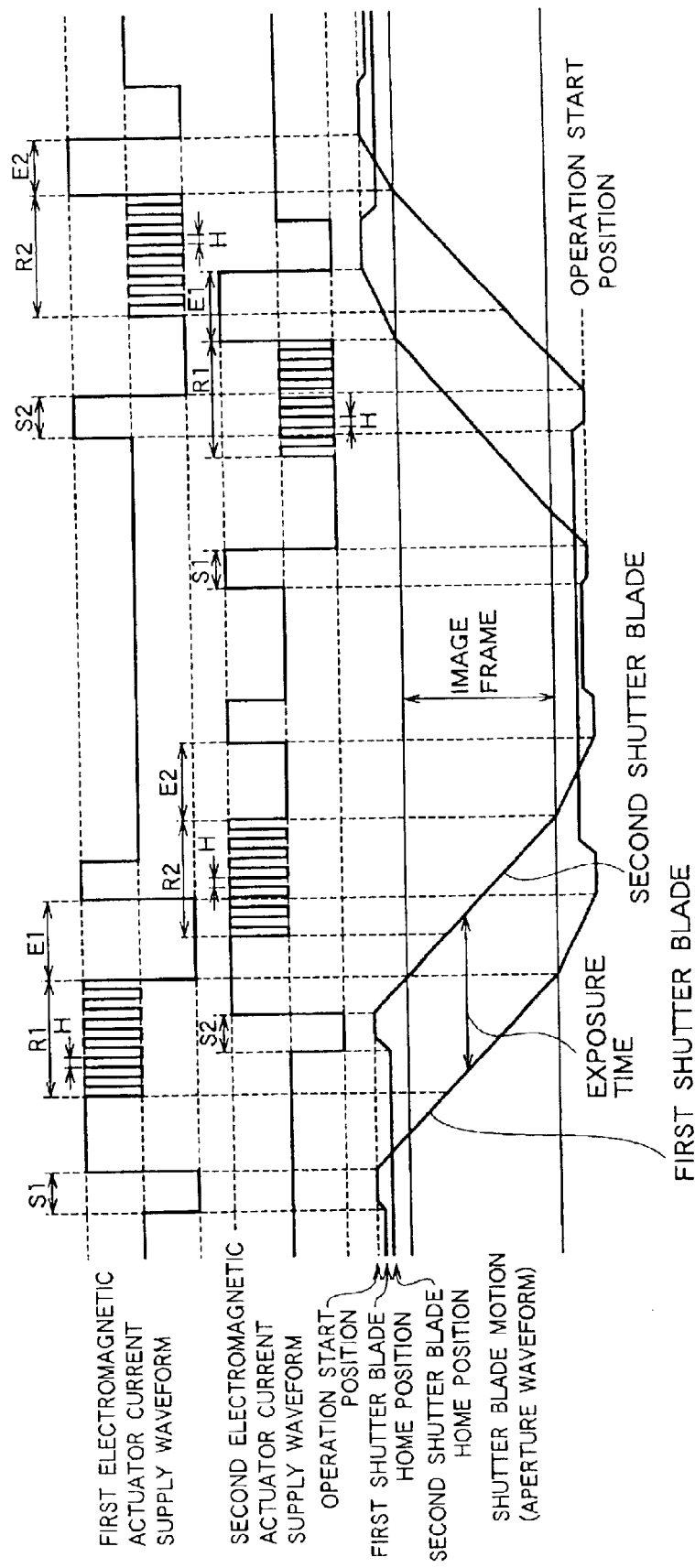
FIG. 28 is a time chart that explains another current supply control and another exposure operation in the camera shutter device shown in FIG. 24.

FIG. 28 is a time chart when other current supply control is made in case the camera shutter device shown in FIGS. 24 to 26 is mounted in a silver-film type camera.

As shown in FIG. 28, in this current supply control, particularly by supplying current with pulse in the predetermined width H in the area R1 where the first shutter blade 510 or the second shutter blade 520 is on the move after starting moving to open and in the area R2 where the second shutter blade 520 or the first shutter blade 510 is on the move after starting moving to close, low electric power supply is provided.

Also, in this current supply control, power consumption can be reduced while the first shutter blade 510 and the second shutter blade 520 move securely by the inertia force in the same manner as above.

As described above, in the camera shutter device, by controlling current supply in the reverse direction immediately before the shutter blades complete the movement, the shutter blades can be positioned securely at the predetermined operation start position and a stable exposure operation can be obtained. Also, by supplying lower electric power in the area where the blades are on the move than in the area where the blades start moving, power consumption required for driving the shutter blades can be reduced while the shutter blades make a stable movement using the inertia force. Moreover, by controlling current supply in the reverse direction immediately before the shutter blades complete the movement, the shutter blades moving due to the inertia force are braked, and a bound phenomenon and the like can be prevented when the blades stop after hitting the stopper or the like. Furthermore, by making the first shutter blade 510 and the second shutter blade 520 function alternately as the before-moving blade and the after-moving blade, the operation to return the blades to one side home position becomes unnecessary, the control sequence can be simplified and the frequency of successive photography can be increased.

More specifically, by controlling current supply for an electromagnetic drive source as required, without using a mechanical holding mechanism for the starting operation or a mechanical brake mechanism or the like required at the completion of the operation, simplification of the configuration can be achieved, power consumption as a whole is reduced and a stable exposure operation without a bound phenomenon or the like can be obtained, and successive photography at a high speed can be realized.

Industrial Applicability

As described above, the electromagnetic actuator in accordance with the present invention is designed in an extremely flat and thin form, while it generates the required driving force. Therefore, it is very useful as a drive source for small-sized devices, and is particularly suitable as a driving force to drive the shutter blade or diaphragm blade of a camera shutter device required to be thin. In addition, a camera shutter device equipped with such an electromagnetic actuator is fit to be applied to cameras such as digital cameras, silver-film type cameras and the like which are desired to be small and thin.

What is claimed is:

1. An electromagnetic actuator comprising:
   an exciting coil;
   a yoke forming a magnetic circuit; and
   a rotatable rotor magnetized with different polarities, rotating with a predetermined angular range due to a current supplied the exciting coil, and having an output portion to output a driving force externally, wherein
   the yoke is a flat plate-like yoke having a first magnetic pole part and a second magnetic pole part that are formed to be opposed to an outer peripheral surface of the rotor, and wherein
   the plate-like yoke is comprised of a pair of yokes of identical shape and formed symmetrically to each other with respect to a rotation axis of the rotor, one of the pair of yokes having the first magnetic pole part and the other of the pair of yokes having the second magnetic pole part, and
   the exciting coil includes a first coil and a second coil that are wound around joint areas of the pair of yokes, so as to generate different poles in the first magnetic pole part and the second magnetic pole part when supplied with the current, and so as to become flat in the same direction as the pair of yokes.

2. The electromagnetic actuator according to claim 1, wherein
   each of the pair of yokes is a laminate where plurality of magnetic plates are laid one upon another in the direction of the rotation axis of the rotor.

3. The electromagnetic actuator according to claim 1, wherein
   the pair of yokes joined to each other at least on planes overlapping in the direction of the rotation axis of the rotor.

4. The electromagnetic actuator according to claim 1, wherein
   the pair of yokes are engaged with each other at least on planes alternately lying in the direction of the rotation axis of the rotor.

5. The electromagnetic actuator according to claim 1, wherein
   the first coil and the second coil are arranged opposite each other with the rotor sandwiched therebetween, and wherein
   the first magnetic pole part and the second magnetic pole part are arranged opposite each other in a direction substantially perpendicular to a direction where the first coil and the second coil are opposed to each other, the first and second magnetic pole parts having constricted portions in their cross sections as magnet circuits.

6. The electromagnetic actuator according to claim 5, wherein
   the first magnetic pole part and the second magnetic pole part have substantially semi-cylindrical opposite surfaces opposed to the rotor, and wherein
   the constricted portions are formed at substantially middle sections of the first magnetic pole part and the second magnetic pole part.

7. The electromagnetic actuator according to claim 1, wherein
   the first magnetic pole part and the second magnetic pole part have substantially semi-cylindrical opposite surfaces that oppose the rotor and are configured to have end face gaps at both ends opposing each other.

8. A camera shutter device comprising:
   a shutter blade opening and closing an aperture for exposure; and
   a drive source driving the, shutter blade, wherein
   the drive source comprises an electromagnetic actuator that includes an exciting coil; a yoke forming a magnetic circuit; and a rotatable rotor magnetize with different polarities, rotating within a predetermined angular range when the coil is supplied with current, and having an output portion to output a driving force externally, and wherein
   the yoke is a flat plate-like yoke having a first magnetic pole part and a second magnetic pole part that are formed to be opposed to an outer peripheral surface of the rotor, and wherein
   the plate-like yoke is comprised of a pair of yokes of identical shape and formed symmetrically to each other with respect to a rotation axis of the rotor, one of the pair of yokes having the first magnetic pole part and the other of the pair of yokes having the second magnetic pole part, and
   the exciting coil includes a first coil and a second coil that are wound around joint areas of the pair of yokes, so as to generate different polarities in the first magnetic pole part and the second magnetic pole part when supplied with the current, and so as to become flat in the same direction as the pair of yokes.

9. The camera shutter device according to claim 8, wherein
   the shutter blade includes a before-moving blade and an after-moving blade that open and close the aperture by substantially linear reciprocating motion, and wherein the electromagnetic actuator includes a first electromagnetic actuator to drive the before-moving blade and a second electromagnetic actuator to drive the after-moving blade.

10. The camera shutter device according to claim 9, wherein
the first electromagnetic actuator and the second electromagnetic actuator are arranged on both sides of the aperture sandwiched the therebetween.

11. The camera shutter device according to claim 9, wherein
the first electromagnetic actuator and the second electromagnetic actuator are arranged side by side on one side of the aperture.

12. The camera shutter device according to claim 9, wherein
the first electromagnetic actuator and the second electromagnetic actuator are arranged side by side on one side of the aperture in such a manner that their extended directions are parallel to each other.

13. The camera shutter device according to claim 8, wherein
the electromagnetic actuator is urged magnetically such that the shutter blade keeps the aperture closed when no current is supplied.

14. The camera shutter device according to claim 8, wherein
the electromagnetic actuator is urged magnetically such that the shutter blade keeps the aperture opened when no current is supplied.

15. The camera shutter device according to claim 8, wherein
the electromagnetic actuator is urged magnetically such that the shutter blade keeps the aperture closed or opened when no current is supplied.

16. The camera shutter device according to claim 8, wherein
the shutter blade includes a first shutter blade and a second shutter blade to open and close the aperture by oscillation, wherein
the drive source is one of the electromagnetic actuator that drives the first shutter blade and the second shutter blade simultaneously.

17. The camera shutter device according to claim 8, wherein
the first magnetic pole part and the second magnetic pole part have substantially semi-cylindrical opposite surfaces that oppose the rotor and are configured to have end face gaps at both ends opposing each other.

18. A camera shutter device comprising:
a shutter blade opening and closing an aperture for exposure;
a drive source directly driving the shutter blade for exposure operation; and
a control means controlling current supply to the drive source, wherein
the drive source comprises an electromagnetic actuator that includes an exciting coil; a yoke forming an magnetic circuit; and a rotatable rotor magnetized with different polarities, rotating within a predetermined angular range when the exciting coil is supplied with current; and having an output portion to output a driving force externally, and wherein
the yoke is a flat plate-like yoke having a first magnetic pole part and a second magnetic pole part that are formed in such a manner as to be opposed to an outer peripheral surface of the rotor, and wherein
the plate-like yoke is comprised of a pair of yokes of identical shape and formed symmetrically to each other with respect to a rotation axis of the rotor, one of the pair of yokes having the first magnetic pole part and the other of the pair of yokes having the second magnetic pole part, and
the exciting coil includes a first coil and a second coil that are wound around joint areas of the pair of yokes, so as to generate different polarities in the first magnetic pole part and the second magnetic pole part when supplied with the current, and so as to become flat in the same direction as the pair of yokes.

19. The camera shutter device according to claim 18, wherein
the control means supplies the electromagnetic actuator with current in a direction opposite to a direction in which the shutter blade moves for photography, to position the shutter blade immediately before the shutter blade starts moving.

20. The camera shutter device according to claim 19, wherein
the shutter blade includes a before-moving blade and an after-moving blade that open and close the aperture by reciprocating motion, and wherein
the electromagnetic actuator includes a first electromagnetic actuator to drive the before-moving blade and a second electromagnetic actuator to drive the after-moving blade, and wherein
the control means supplies the before-moving blade electromagnetic actuator and the after-moving blade electromagnetic actuator with current.

21. The camera shutter device according to claim 18, wherein
the control means supplies the electromagnetic actuator with a lower power in an area where the shutter blade is on the move after starting moving, than in an area where the shutter blade starts moving for photography.

22. The camera shutter device according to claim 21, wherein
the control means supplies the lower power by lowering a value of the current to be supplied.

23. The camera shutter device according to claim 21, wherein
the control means supplies the lower power by a pulsed current supply.

24. The camera shutter device according to claim 21, wherein
the shutter blade includes a before-moving blade and an after-moving blade that open and close the aperture by reciprocating motion, and wherein
the electromagnetic actuator includes a before-moving blade electromagnetic actuator to drive the before-moving blade and an after-moving blade electromagnetic actuator to drive the after-moving blade, and wherein
the control means supplies the before-moving blade electromagnetic actuator and the after-moving blade electromagnetic actuator with current.

25. The camera shutter device according to claim 18, wherein
the control means supplies the electromagnetic actuator with current in a direction opposite to a direction in which the shutter blade moves for photography, immediately before the shutter blade completes its movement.

26. The camera shutter device according to claim 2, wherein
the shutter blade includes a before-moving blade and an after-moving blade that open and close the aperture by reciprocating motion, and wherein
the electromagnetic actuator includes a before-moving blade electromagnetic actuator to drive the before-moving blade and an after-moving blade electromagnetic actuator to drive the after-moving blade, and wherein
the control means supplies the first electromagnetic actuator and the second electromagnetic actuator with current.

27. The camera shutter device according to claim 18, wherein
the shutter blade includes a first shutter blade and a second shutter blade that open and close the aperture by reciprocating motion, and wherein
the electromagnetic actuator includes a first electromagnetic actuator to drive the first shutter blade and a second electromagnetic actuator to drive the second shutter blade, and wherein
the control means controllably supplies the first electromagnetic actuator and the second electromagnetic actuator with current so that the first shutter blade moves as a before-moving blade and the second shutter blade moves as an after-moving blade, respectively, and next the second shutter blade moves as a before-moving blade and the first shutter blade moves as an after-moving blade, respectively.

28. The camera shutter device according to claim 27, wherein
the control means supplies the first electromagnetic actuator and the second electromagnetic actuator with current in a direction opposite to a direction in which the first shutter blade and the second shutter blade move for photography, to position the first shutter blade and the second shutter blade immediately before the first shutter blade and the second shutter blade start moving.

29. The camera shutter device according to claim 27, wherein
the control means supplies the first electromagnetic actuator an the second electromagnetic actuator with a lower power in an area where the first shutter blade and the second shutter blade are on the move after starting moving, than in an area where the first shutter blade and the second shutter blade start moving for photography.

30. The camera shutter device according to claim 29, wherein
the control means supplies the lower current by lowering a value of current to be supplied.

31. The camera shutter device according to claim 29, wherein
the control means supplies the lower current by a pulsed current supply.

32. The camera shutter device according to claim 27, wherein
the control means supplies the first electromagnetic actuator and the second electromagnetic actuator with current in a direction opposite to a direction in which the first shutter blade and the second shutter blade move for photography, immediately before the first shutter blade and the second shutter blade complete their movement.

33. The camera shutter device according to claim 18, wherein
the first magnetic pole part and the second magnetic pole part have substantially semi-cylindrical opposite surfaces that oppose the rotor and are configured to have end face gaps at both ends opposing each other.

34. An electromagnetic actuator comprising:
an exciting coil;
a yoke forming a magnetic circuit; and
a rotatable rotor magnetized with different polarities, rotating with a predetermined angular range due to a current supplied to the exciting coil, and having an output portion to output a driving force externally, wherein
the yoke is a flat plate-like yoke having a first magnetic pole part and a second magnetic pole part that are formed to be opposed to an outer peripheral surface of the rotor, and wherein
the plate-like yoke consists of a pair of yokes of identical shape and formed symmetrically to each other with respect to a rotation axis of the rotor, one of the pair of yokes having the first magnetic pole part and the other of the pair of yokes having the second magnetic pole part.

35. A camera shutter device comprising:
a shutter blade opening and closing an aperture for exposure; and
a drive source driving the shutter blade, wherein
the drive source comprises an electromagnetic actuator that includes an exciting coil; a yoke forming a magnetic circuit; and a rotatable rotor magnetize with different polarities, rotating within a predetermined angular range when the coil is supplied with current, and having an output portion to output a driving force externally, and wherein
the yoke is a fiat plate-like yoke having a first magnetic pole part and a second magnetic pole part that are formed to be opposed to an outer peripheral surface of the rotor, and wherein
the plate-like yoke consists of a pair of yokes of identical shape and formed symmetrically to each other with respect to a rotation axis of the rotor, one of the pair of yokes having the first magnetic pole part and the other of the pair of yokes having the second magnetic pole part.

36. A camera shutter device comprising:
a shutter blade opening and closing an aperture for exposure;
a drive source directly driving the shutter blade for exposure operation; and
a control means controlling current supply to the drive source, wherein
the drive source comprises an electromagnetic actuator that includes an exciting coil; a yoke forming an magnetic circuit; and a rotatable rotor magnetized with different polarities, rotating within a predetermined angular range when the exciting coil is supplied with current; and having an output portion to output a driving force externally, and wherein
the yoke is a flat plate-like yoke having a first magnetic pole part and a second magnetic pole part that are formed in such a manner as to be opposed to an outer peripheral surface of the rotor, and wherein
the plate-like yoke consists of a pair of yokes of identical shape and formed symmetrically to each other with respect to a rotation axis of the rotor, one of the pair of yokes having the first magnetic pole part and the other of the pair of yokes having the second magnetic pole part.

* * * * *

UNITED STATES PATENT AND TRADEMARK OFFICE
CERTIFICATE OF CORRECTION

PATENT NO. : 6,821,033 B2
DATED : November 23, 2004
INVENTOR(S) : Jay DeAvis Baker et al.

It is certified that error appears in the above-identified patent and that said Letters Patent is hereby corrected as shown below:

Title page,
Item [75], Inventors, delelte "Jimmy Attard," and substitute -- Joe Attard -- in its place.

Column 6,
Line 19, after "first" delete "end" and substitute -- and -- in its place.

Signed and Sealed this

Third Day of May, 2005

JON W. DUDAS
*Director of the United States Patent and Trademark Office*